(12) United States Patent
Takiya et al.

(10) Patent No.: US 9,764,660 B2
(45) Date of Patent: Sep. 19, 2017

(54) SLIDE RAIL

(71) Applicant: TOYOTA BOSHOKU KABUSHIKI KAISHA, Aichi-ken (JP)

(72) Inventors: Kouji Takiya, Toyota (JP); Hiroshi Mizobata, Seto (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/612,747

(22) Filed: Feb. 3, 2015

(65) Prior Publication Data

US 2015/0217661 A1 Aug. 6, 2015

(30) Foreign Application Priority Data

Feb. 5, 2014 (JP) .................. 2014-020200
Apr. 15, 2014 (JP) .................. 2014-083443

(51) Int. Cl.
*B60N 2/08* (2006.01)
*B60N 2/075* (2006.01)
*B60N 2/07* (2006.01)

(52) U.S. Cl.
CPC ........... *B60N 2/0806* (2013.01); *B60N 2/075* (2013.01); *B60N 2/0705* (2013.01); *B60N 2/0818* (2013.01); *B60N 2/0843* (2013.01)

(58) Field of Classification Search
CPC .. B60N 2/0727; B60N 2/0705; B60N 2/0843; B60N 2/0818; B60N 2/0715;

(Continued)

(56) References Cited

U.S. PATENT DOCUMENTS

| 2,328,121 A * | 8/1943 | Bartek | .................. A01D 80/02 |
| | | | 267/33 |
| 2004/0188586 A1* | 9/2004 | Jaudouin | .................. B60N 2/08 |
| | | | 248/429 |

(Continued)

FOREIGN PATENT DOCUMENTS

| CN | 103260943 | 8/2013 |
| CN | 103492224 | 1/2014 |

(Continued)

OTHER PUBLICATIONS

Chinese Office Action for CN App. No. 201510060939.1 mailed on Aug. 12, 2016, along with English-language translation thereof.

(Continued)

*Primary Examiner* — Muhammad Ijaz
(74) *Attorney, Agent, or Firm* — Greenblum & Bernstein, P.L.C.

(57) ABSTRACT

A slide rail by which a conveyance seat is slidably coupled to a floor of a conveyance includes: a lower rail attached on the floor; an upper rail slidably assembled to the lower rail and attached to the conveyance seat; and a locking spring supported by the upper rail and having a locking piece that is inserted into a locking slit formed in the lower rail to prohibit the upper rail and the lower rail from sliding relative to each other. The locking piece extends in a direction along a cross-section (the width direction) of the upper rail from a position in the locking spring, at which the locking spring is supported by the upper rail. The locking piece is inserted into the locking slit by deflection deformation of the locking piece in an in-plane direction of the cross-section (the height direction) of the upper rail.

8 Claims, 14 Drawing Sheets

(58) Field of Classification Search
CPC . B60N 2/067; B60N 2/02; B60N 2/04; B60N 2/06; B60N 2/01508; B60N 2/0156; B60N 2/08; B60N 2/0806; B60N 2/0825; B60N 2/085; B60N 2/0837; B60N 2/075
USPC .............. 248/424, 425, 429, 430; 296/65.13, 296/65.14, 65.15; 267/33, 180
See application file for complete search history.

(56) References Cited

U.S. PATENT DOCUMENTS

| | | | | |
|---|---|---|---|---|
| 2004/0232750 | A1* | 11/2004 | Rohee | B60N 2/08 297/334 |
| 2005/0056761 | A1* | 3/2005 | Danjo | B60N 2/072 248/429 |
| 2009/0289485 | A1* | 11/2009 | Walter | B60N 2/0705 297/344.1 |
| 2011/0012005 | A1* | 1/2011 | Jahner | B60N 2/0806 248/429 |
| 2011/0108697 | A1* | 5/2011 | Ito | B60N 2/0707 248/429 |
| 2013/0134281 | A1* | 5/2013 | Naoki | B60N 2/0705 248/430 |
| 2013/0168524 | A1* | 7/2013 | Aoi | B60N 2/0705 248/430 |
| 2013/0264454 | A1* | 10/2013 | Hayashi | B60N 2/0705 248/429 |
| 2014/0042289 | A1* | 2/2014 | Kawano | B60N 2/0818 248/429 |
| 2014/0224954 | A1* | 8/2014 | Oh | B60N 2/0705 248/429 |

FOREIGN PATENT DOCUMENTS

| | | |
|---|---|---|
| DE | 10040593 | 3/2002 |
| DE | 102004013188 | 10/2004 |
| JP | 2010-064534 | 3/2010 |
| JP | 2012-061894 | 3/2012 |
| JP | 2012-126183 | 7/2012 |
| KR | 10-2012-0119240 | 10/2012 |

OTHER PUBLICATIONS

German Official Action with partial English translation for DE102015201803.2, dated Apr. 24, 2017.

* cited by examiner

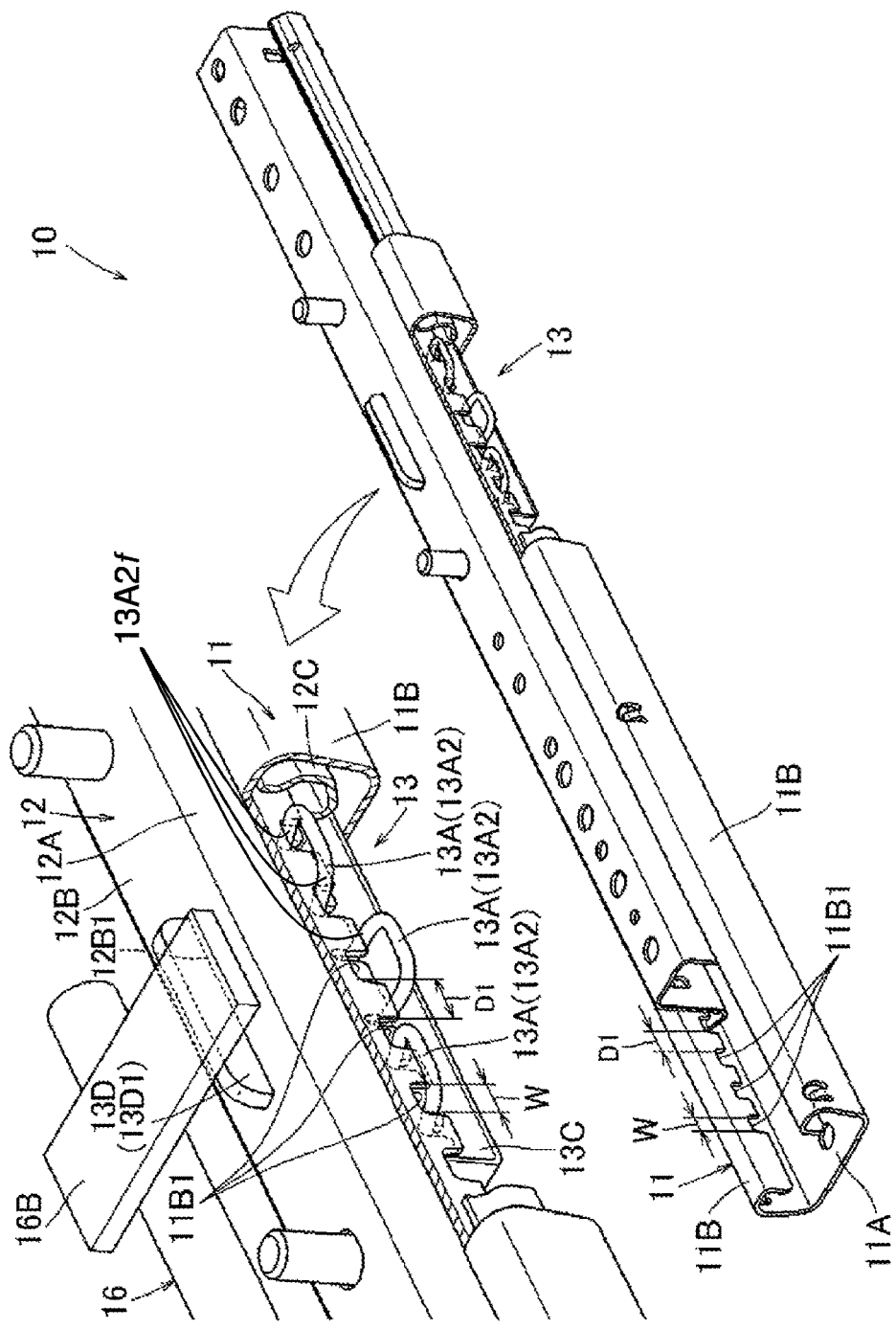

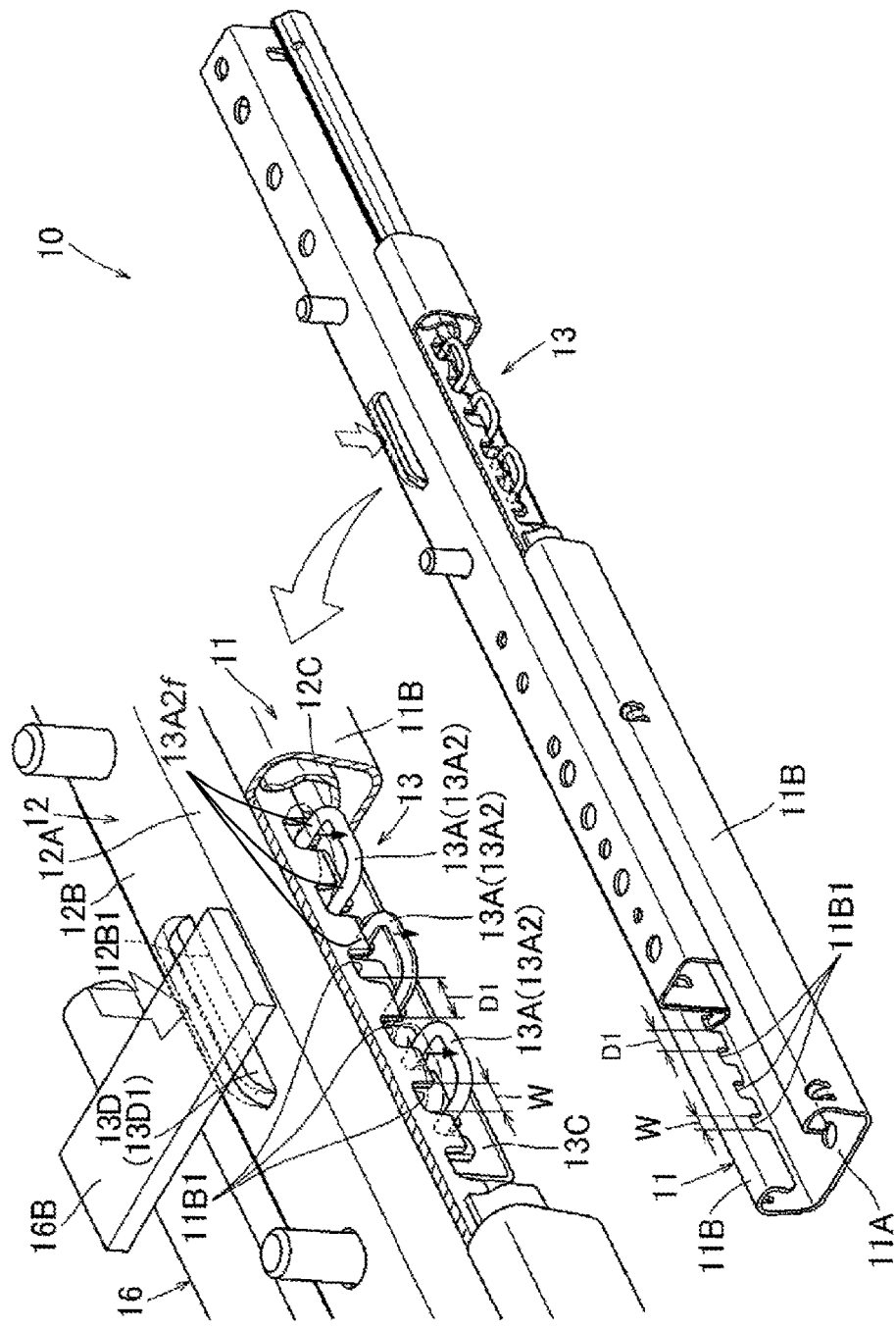

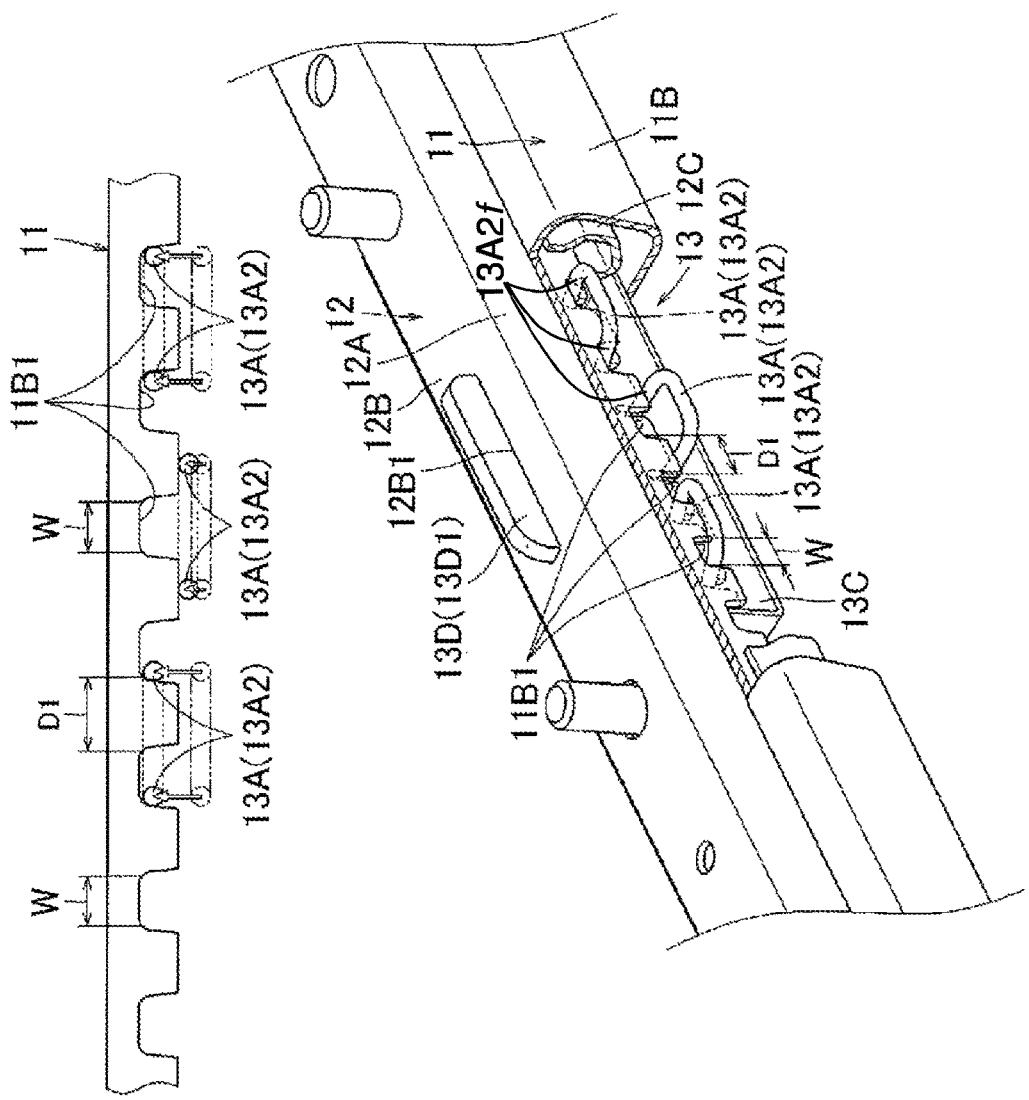

SLIDE RAIL

INCORPORATION BY REFERENCE

The disclosure of Japanese Patent Application No. 2014-083443 filed on Apr. 15, 2014 including the specification, drawings and abstract is incorporated herein by reference in its entirety.

BACKGROUND OF THE INVENTION

1. Field of the Invention

The invention relates to a slide rail. More specifically, the invention relates to a slide rail by which a conveyance seat is slidably coupled to a floor of a conveyance.

2. Description of Related Art

For example, Japanese Patent Application Publication No. 2012-126183 (JP 2012-126183 A) describes a conventional slide rail for a vehicle seat. The slide rail includes, a lower rail attached on a floor, and an upper rail attached to the vehicle seat and assembled to the lower rail so as to be slidable back and forth relative to the lower rail. The slide rail is provided with a locking mechanism that usually locks the upper rail to the lower rail to prohibit the upper rail from sliding relative to the lower rail. The locking mechanism in JP 2012-126183 A includes, an elongate locking spring extending in the sliding direction. The locking spring is supported at one end by the upper rail. When locking portions of the locking spring are elastically inserted into locking slits of the lower rail from below, the upper rail is locked to the lower rail and thus the upper rail is prohibited from sliding relative to the lower rail.

SUMMARY OF THE INVENTION

According to the related art, the locking portions of the locking spring are inserted into the locking slits due to the deflection deformation of the locking spring caused by the one end support structure. Thus, it is necessary to set the dimensions of each locking slit such that the locking slit includes a clearance that allows a slight displacement of the locking spring in the sliding direction due to the deflection deformation of the locking spring. These clearances may be a factor of a backlash of the locking mechanism in the sliding direction, which occurs when the upper rail is locked to the lower rail. The invention provides a slide rail including a locking mechanism with a less backlash in the sliding direction, the locking mechanism being composed of a smaller number of components.

An aspect of the invention relates to a slide rail by which a conveyance seat is slidably coupled to a floor of a conveyance. The slide rail includes: a lower rail attached on the floor; an upper rail slidably assembled to the lower rail and attached to the conveyance seat; and a locking spring supported by one rail that is one of the lower rail and the upper rail. The locking spring has a locking piece that is inserted into a locking slit formed in the other rail that is the other one of the lower rail and the upper rail to prohibit the upper rail and the lower rail from sliding relative to each other. The locking piece extends in a direction along a cross-section of the one rail from a position in the locking spring, at which the locking spring is supported by the one rail. The locking piece is inserted into the locking slit by deflection deformation of the locking piece in an in-plane direction of the cross-section of the one rail.

According to the above aspect, it is possible to simplify the configuration by causing deflection deformation of the locking piece of the locking spring such that the locking piece of the locking spring is directly inserted into the locking slit of the lower rail. The locking piece of the locking spring is not deflected and deformed in the sliding direction when being inserted into the locking slit of the lower rail. Thus, it is not necessary to provide the locking slit with a clearance that allows the deformation in the sliding direction. Thus, it is possible to provide a locking mechanism with a less backlash in the sliding direction, the locking mechanism being composed of a smaller number of components.

In the above aspect, the locking spring may be accommodated in a rail space defined by the lower rail and the upper rail.

With this configuration, the locking spring is formed in a compact size, so that the locking spring does not project from the upper rail and the lower rail. Further, it is possible to improve the locking strength by reducing the effective deflection length of the locking piece of the locking spring.

The slide rail according to the above aspect may further includes an unlocking member that cancels a slide lock state in which the lower rail and the upper rail are prohibited from sliding relative to each other. The locking piece may be configured to be inserted into the locking slit by restoring deformation around an axis extending in a sliding direction in which the lower rail and the upper rail slide relative to each other. A portion of the locking piece located between another portion of the locking piece that is inserted into the locking slit and an axis of the locking spring may be operated by the unlocking member to cancel the slide lock state.

With this configuration, because the portion of the locking spring, which is moved by a small amount by a pivot motion, is used as an unlocking operation portion, the operation amount for cancelling the locked state of the locking spring can be set small.

In the above aspect, the locking spring may have a pair of the locking pieces that respectively project outward on opposite sides in the direction along the cross-section of the one rail from a central position of the one rail in the width direction, and the locking pieces may be concurrently inserted into the locking slits in a height direction of the one rail.

With this configuration, it is possible to provide the compact locking mechanism with improved locking strength, by reducing the effective deflection length of each of the locking pieces of the locking spring. In addition, it is possible to provide the configuration including a pair of the locking pieces with improved locking strength, so that the upper rail is locked to the lower rail in a balanced manner in the width direction.

In the above aspect, a plurality of the locking springs may be provided; and a pitch between the locking slits may be defined such that the locking piece of at least one of the locking springs is allowed to be inserted into the locking slit irrespective of a slide position of the upper rail.

With this configuration, the locking piece of at least one of the locking spring is allowed to be inserted into the locking slit irrespective of the slide position of the upper rail. Thus, even if an unexpected and abrupt sliding motion is caused due to, for example, a vehicle collision, it is possible to prohibit the upper rail from sliding relative to the lower rail beyond a prescribed range.

In the above aspect, the locking spring may be formed by bending a single wire rod, the locking spring may have a coil portion that is wound around and fitted to a support shaft supported by the one rail, and a pair of the locking pieces that respectively extend from the coil portion on opposite sides in the direction along the cross-section of the one rail, the locking pieces being inserted into the locking slits by deflection deformation of the locking pieces in the in-plane direction of the cross-section of the one rail; and both end portions of the wire rod that constitutes the locking spring may be wound around the support shaft.

In this configuration, the end portions of the wire rod that constitutes each locking spring is formed in such a shape as to be wound around the support shaft. Thus, it is possible to suppress backlash and deflection that cause each locking piece to move in a direction away from the support shaft. Thus, when the locking pieces are inserted into the locking slits, if a large load that forcibly displaces the upper rail or the lower rail in the sliding direction is applied to the upper rail or the lower rail, the displacement in the sliding direction is reliably prevented because each locking piece is firmly hooked to the support shaft without being removed from the support shaft. As a result, it is possible to further increase the locking strength with which the upper rail is locked to the lower rail.

In the above aspect, each of the locking pieces may have a U-shape, and project from the coil portion in the direction along the cross-section of the one rail, each of the locking pieces may have frame portions that are arranged in a sliding direction, and the frame portions of each of the locking pieces may be inserted into the locking slits.

With this configuration, the two frame portions of each locking piece of each locking spring, which is formed by bending a single wire rod, are allowed to be inserted into the locking slits. Thus, it is possible to further increase the locking strength of the slide rail.

In the above aspect, the locking spring may be formed by i) bending the wire rod such that the U-shaped locking piece on one side projects from one end portion of the locking spring on one side in the sliding direction toward the other end portion of the locking spring on the other side in the sliding direction, ii) winding the wire rod from a bending end position of the locking piece on the one side back toward the one side in the sliding direction to form the coil portion, and iii) bending the wire rod such that the U-shaped locking piece on the other side projects from a winding end position of the coil portion toward the other end portion of the locking spring on the other side in the sliding direction; and the one end portion of the locking spring in the sliding direction and the other end portion of the locking spring in the sliding direction may each be curved in such a shape as to be wound around the support shaft that is passed through the coil portion.

With this configuration, the locking spring is formed by winding a wire rod. Thus, it is possible to form, from a single wire rod, the locking spring that has a pair of the U-shaped locking pieces that project in a direction along the cross-section of the one rail, and the coil portion that is wound around and thus fitted to the support shaft. The locking spring is compact in the sliding direction, and the two locking pieces of the locking spring are arranged side by side in the width direction of the one rail.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8A is a fragmentary perspective view of the slide rail in a locked state;

FIG. 8B is an enlarged view of main portions of the slide rail illustrated in FIG. 8A;

FIG. 9A is a fragmentary perspective view of the slide rail in an unlocked state;

FIG. 9B is an enlarged view of the main portions of the slide rail illustrated in FIG. 9A;

FIG. 12A is a schematic view illustrating a third lock pattern of the slide rail;

FIG. 12B is a side view illustrating the main portions of the slide rail illustrated in FIG. 12A;

DETAILED DESCRIPTION OF EMBODIMENTS

Hereinafter, example embodiments of the invention will be described with reference to the accompanying drawings.

Figure 1:
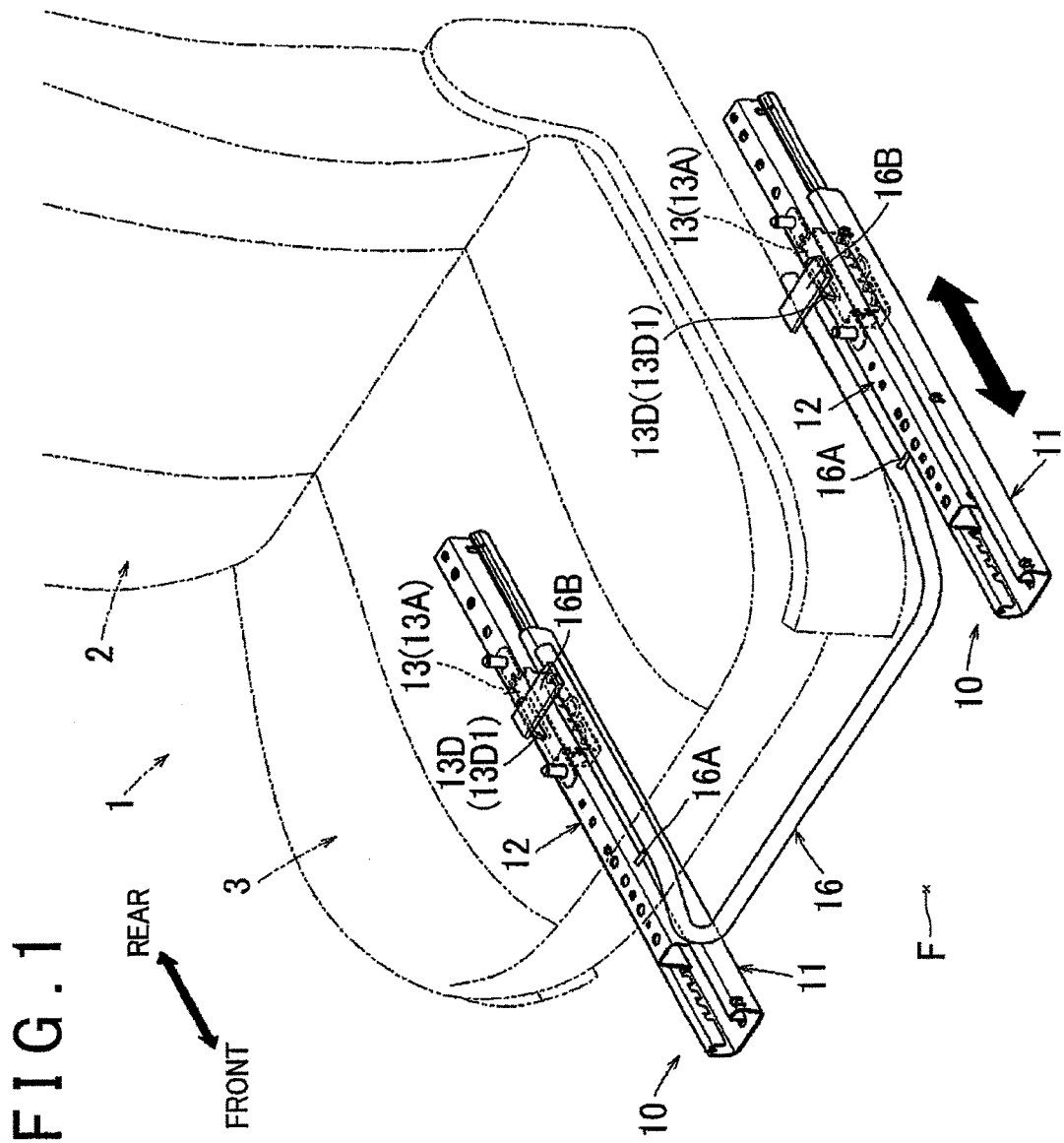
FIG. 1 is a perspective view illustrating the schematic configuration of a seat provided with slide rails according to an embodiment of the invention.

First, the configuration of a slide rail 10 according to an embodiment of the invention will be described with reference to FIG. 1 to FIG. 14. The slide rail 10 according to the present embodiment is configured as a coupling member by which a seat 1 of an automobile is coupled to a floor F of the automobile so as to be slidable in the front-rear direction of the automobile, as illustrated in FIG. 1. A pair of right and left slide rails 10 is disposed between the seat 1 and the floor F. Each of the slide rails 10 is provided with a locking mechanism 13. The locking mechanism 13 has a configuration that allows switchover between a locked state where the sliding motion of the seat 1 in the front-rear direction is prohibited and an unlocked state where the locked state is cancelled to allow the sliding motion of the seat 1. This configuration allows the slide rails 10 to adjust the position of the seat 1 relative to the floor F in the front-rear direction.

The seat 1 is configured as a driver's seat (the seat on the right side in the front row, in the present embodiment) of the automobile. The seat 1 includes a seatback 2 into which an occupant leans back, and a seat cushion 3 on which the occupant is seated. The right and left lower end portions of the seatback 2 are coupled respectively to the right and left rear end portions of the seat cushion 3. The seat cushion 3 is coupled onto the floor F with the pair of right and left slide rails 10 disposed between the bottom face of the seat cushion 3 and the floor F. Thus, the seat cushion 3 is slidable back and forth relative to the floor F.

Usually, the slide rails 10 are held in the state where the sliding motions thereof are prohibited. When the occupant pulls up a U-shaped slide lever 16 that protrudes from the lower front portion of the seat cushion 3, the locked states of the slide rails 10 are cancelled concurrently to allow switchover to the state where the seat 1 is slidable in the front-rear direction. When the occupant cancels the operation of pulling up the slide lever 16, the restoring force restores the slide rails 10 to the state where the sliding motions thereof are prohibited. The switching operation allows the seat 1 to slide on the slide rails 10 back and forth relative to the floor F or causes the seat 1 to be fixed at a prescribed position.

Figure 2:
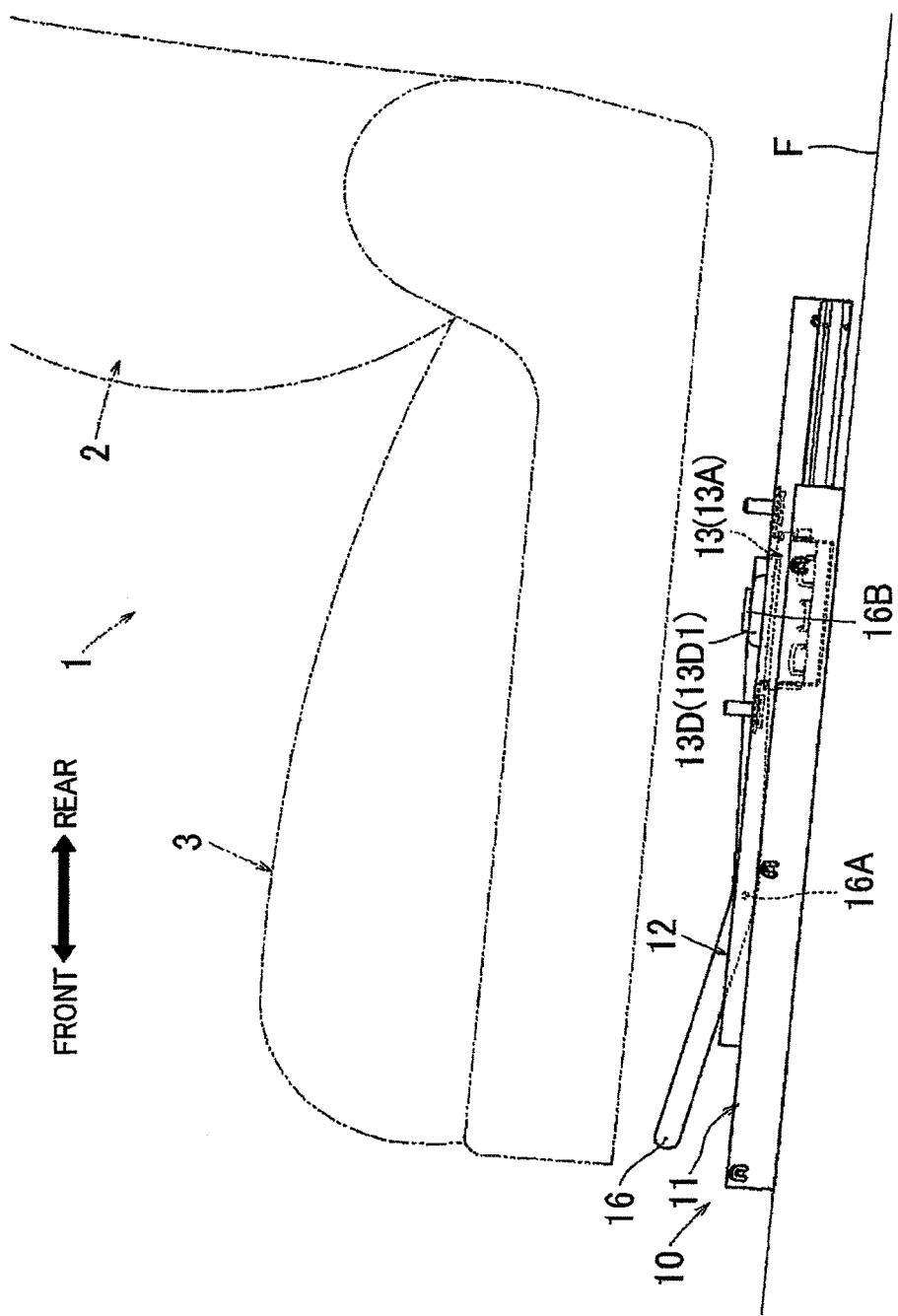
FIG. 2 is a side view of the seat.

As illustrated in FIG. 2, the seat 1 is disposed so as to be slightly tilted as a whole along the floor F, in such a posture that the lower front end of the seat 1 is located at a position higher than the lower rear end thereof. More specifically, the floor F is tilted upward in a direction toward the front of the automobile, so that the seat 1 is disposed so as to be tilted upward in a direction toward the front of the automobile together with the slide rails 10 disposed on the floor F. This configuration enables even a small occupant seated in the seat 1 to have a wide front visual field.

The configuration of each slide rail 10 will be described in detail below. The slide rails 10 are configured to be mirror images of each other. Therefore, the configuration of the slide rail 10 on the right side in FIG. 1 will be described below. Note that the slide rail 10 on the left side in FIG. 1 has the same configuration as that of the slide rail 10 on the right side.

Figure 4:
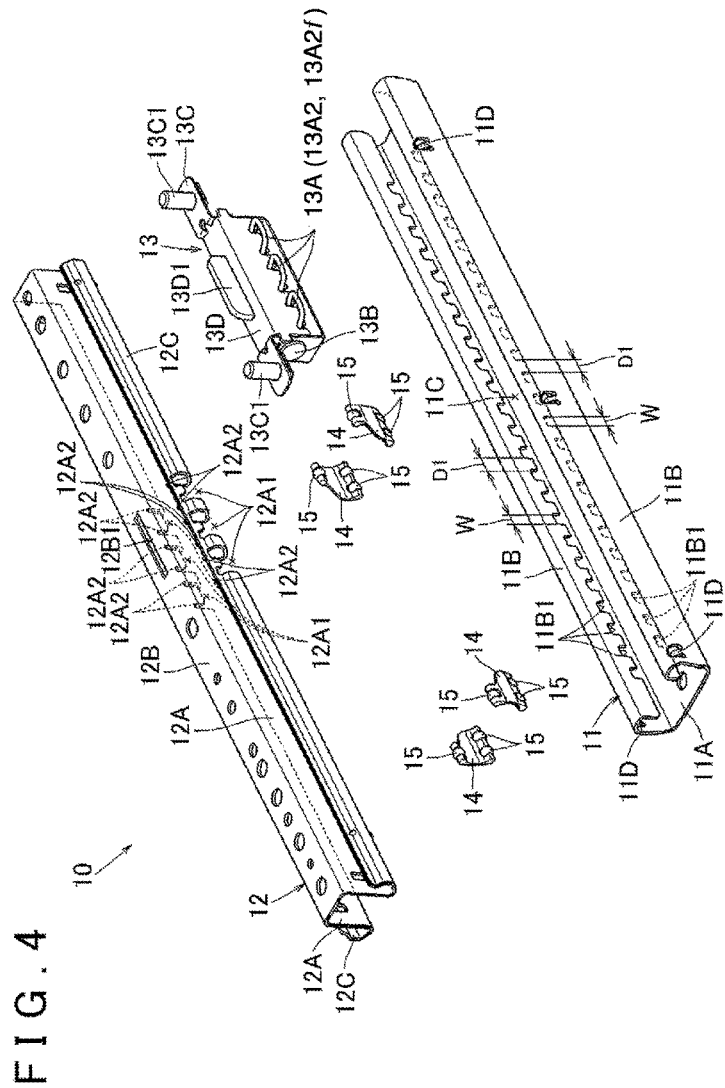
FIG. 4 is an exploded perspective view of the slide rail.

As illustrated in FIG. 4, the slide rail 10 includes a lower rail 11, an upper rail 12, the locking mechanism 13, four resin shoes 14, and a plurality of steel balls 15. The lower rail 11 is attached on the floor F (see FIG. 1 and FIG. 2). The upper rail 12 is attached to the bottom portion of the seat cushion 3 (see FIG. 1 and FIG. 2). The locking mechanism 13 is used to prohibit sliding motion of the upper rail 12 relative to the lower rail 11. The four resin shoes 14 are disposed between the lower rail 11 and the upper rail 12. The steel balls 15 are fitted to the upper end portion and the lower end portion of each resin shoe 14. The upper rail 12 may function as "one rail" in the invention, and the lower rail 11 may function as "the other rail" in the invention.

Figure 6:
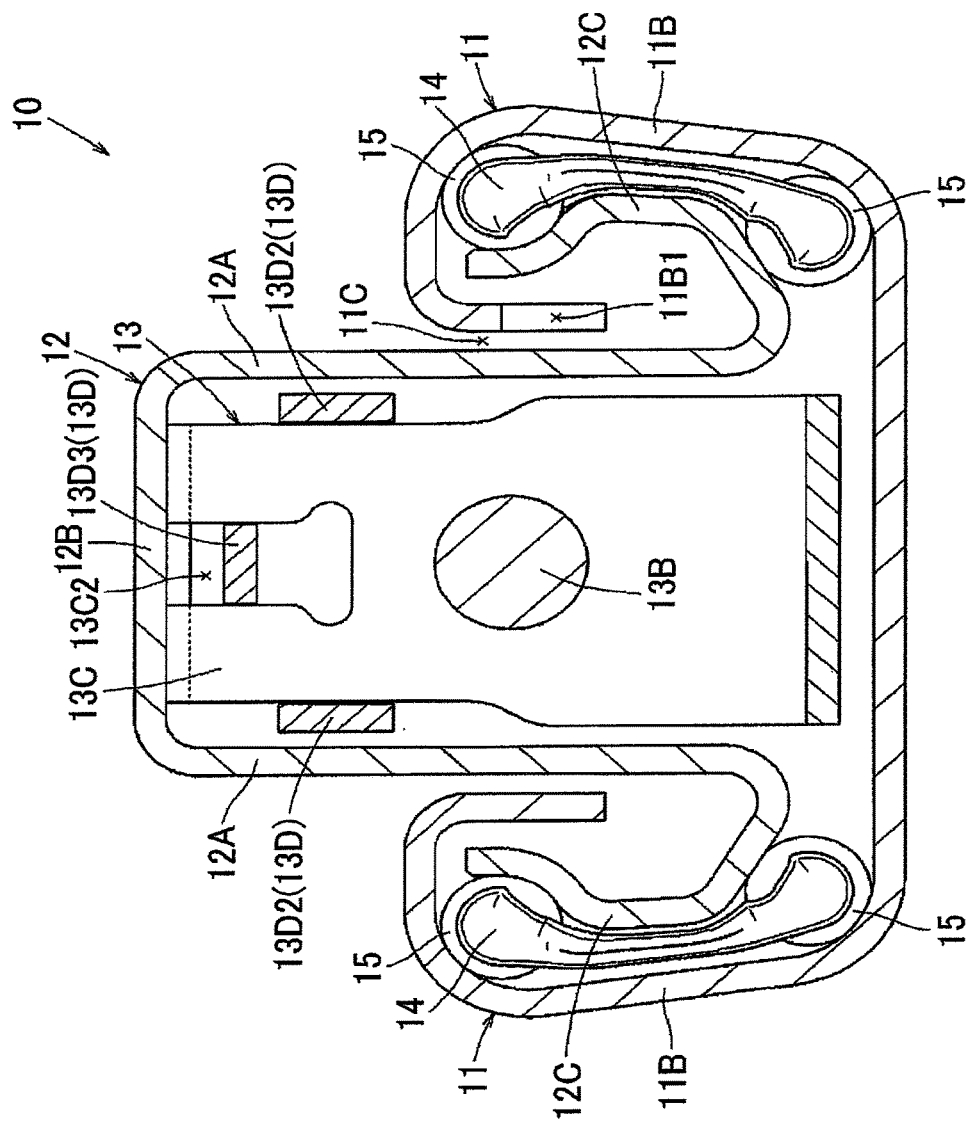
FIG. 6 is a sectional view taken along the line VI-VI in FIG. 3.

The lower rail 11 extends in the front-rear direction of the automobile. The lower rail 11 is formed by bending a single elongate steel sheet at several positions such that the lower rail 11 has a generally U-shaped cross-section. A bottom wall portion 11A of the lower rail 11 is fastened at two positions onto the floor F (see FIG. 1 and FIG. 2) with bolts, so that the lower rail 11 is fixedly fitted to the floor F. One of the two positions is at the front portion of the lower rail 11, and the other one of the two positions is at the rear portion of the lower rail 11. The lower rail 11 is formed by bending the steel sheet such that the cross-sectional shape thereof is substantially uniform along the longitudinal direction thereof (the sliding direction in which the upper rail 12 and the lower rail 11 slide relative to each other). Specifically, the lower rail 11 has the bottom wall portion 11A and a pair of right and left lower-side ridge portions 11B. As illustrated in FIG. 4 and FIG. 6, the bottom wall portion 11A is disposed on the floor F such that the upper face of the bottom wall portion 11A faces upward. The right and left lower-side ridge portions 11B extend upward respectively from the right and left edge portions of the bottom wall portion 11A. The lower-side ridge portions 11B are each bent inward in the width direction of the lower rail 11 so as to be formed into an inverted U-shape such that the lower-side ridge portions 11B face each other.

The edge portion, which is the distal end portion of each lower-side ridge portion 11B bent into an inverted U-shape, has a plurality of locking slits 11B1 arranged at regular intervals along the sliding direction. Each locking slit 11B1 is a rectangular cutout formed along the edge portion. As clearly indicated in FIG. 10A to FIG. 12B, the locking slits 11B1 each has a slit width W of 5 mm (the width of the bottom face of the locking slit 11B1 in the slit depth direction (i.e., the width of the tipper face of the locking slit 11B1 in the up-down direction of the lower rail 11)) in the sliding direction, and the locking slits 11B1 are arranged at regular intervals of 10 mm (an interval D1) along the sliding direction. Each locking slit 11B1 is formed in such a shape that the slit width W is gradually increased toward the opening (the lower side) of the locking slit 11B1. When locking springs 13A of the locking mechanism 13 attached to the upper rail 12 are inserted into the locking slits 11B1 from below, the locking slits 11B1 function to prohibit the sliding motion of the upper rail 12.

As illustrated in FIG. 4 and FIG. 6, shoe stoppers 11D are formed in a front end region; a rear end region and a central region of each of the lower-side ridge portions 11B of the lower rail 11. The shoe stoppers 11D are formed by cutting portions of each lower-side ridge portion 11B and bending the cut portions inward in the width direction of the lower rail 11. The shoe stoppers 11D restrict the back-and-forth sliding motions of the four resin shoes 14 within prescribed ranges. The shoe stoppers 11D are placed on the lower-side ridge portions 11B and slide along the lower-side ridge portions 11B. When the resin shoes 14 are brought into contact with the shoe stoppers 11D, the shoe stoppers 11D prohibit the resin shoes 14 from further sliding in the front-rear direction relative to the lower rail 11.

Rail stoppers (not illustrated) are formed in outer side wall portions of the lower-side ridge portions 11B of the lower rail 11. The rail stoppers are formed by cutting portions of each lower-side ridge portion 11B and bending the cut portions inward in the width direction of the lower rail 11. The rail stoppers restrict the back-and-forth sliding motion of the upper rail 12, which slides along the lower rail 11, within a prescribed range. The rail stoppers (not illustrated) are formed in a front end region and a rear end region of the lower rail 11 by cutting portions of each lower-side ridge portion 11B and bending the cut portions inward in the width direction of the lower rail 11. When one of a front stopper and a rear stopper (both are not illustrated), which are formed by cutting portions of each of right and left upper-side ridge portions 12C and bending the cut portions in the width direction of the upper rail 12, is brought into contact with the rail stoppers of the lower rail 11, the back-and-forth sliding motion of the upper rail 12 is restricted.

The upper rail 12 extends in the front-rear direction of the automobile. The upper rail 12 is formed by bending a single elongate steel sheet at several positions such that the upper rail 12 has a generally hat-shaped cross-section. A top wall portion 12B of the upper rail 12 is fastened to a frame (not illustrated) of the seat cushion 3 (see FIG. 1 and FIG. 2) with bolts, so that the upper rail 12 is fixedly fitted to the frame. The upper rail 12 is inserted into the lower rail 11 from one of the openings of the lower rail 11 in the longitudinal direction of the lower rail 11 (the sliding direction), so that the upper rail 12 is assembled to the lower rail 11 so as to be slidable in the longitudinal direction of the lower rail 11 (see FIG. 3).

The upper rail 12 is formed by bending the steel sheet such that the cross-sectional shape thereof is substantially uniform along the longitudinal direction thereof (the sliding direction). Specifically, as illustrated in FIG. 4 and FIG. 6, the upper rail 12 has a pair of right and left vertical wall portions 12A, the top wall portion 12B, and a pair of the right and left upper-side ridge portions 12C. The vertical wall portions 12A extend in the height direction of the upper rail 12 through a clearance 11C between the right and left lower-side ridge portions 11B of the lower rail 11. The top wall portion 12B extends to connect the upper ends of the vertical wall portions 12A to each other. The right and left upper-side ridge portions 12C extend upward and outward in the width direction of the upper rail 12 from the lower ends of the vertical wall portions 12A, and bent into a U-shape so as to face back-to-back.

Figure 3:
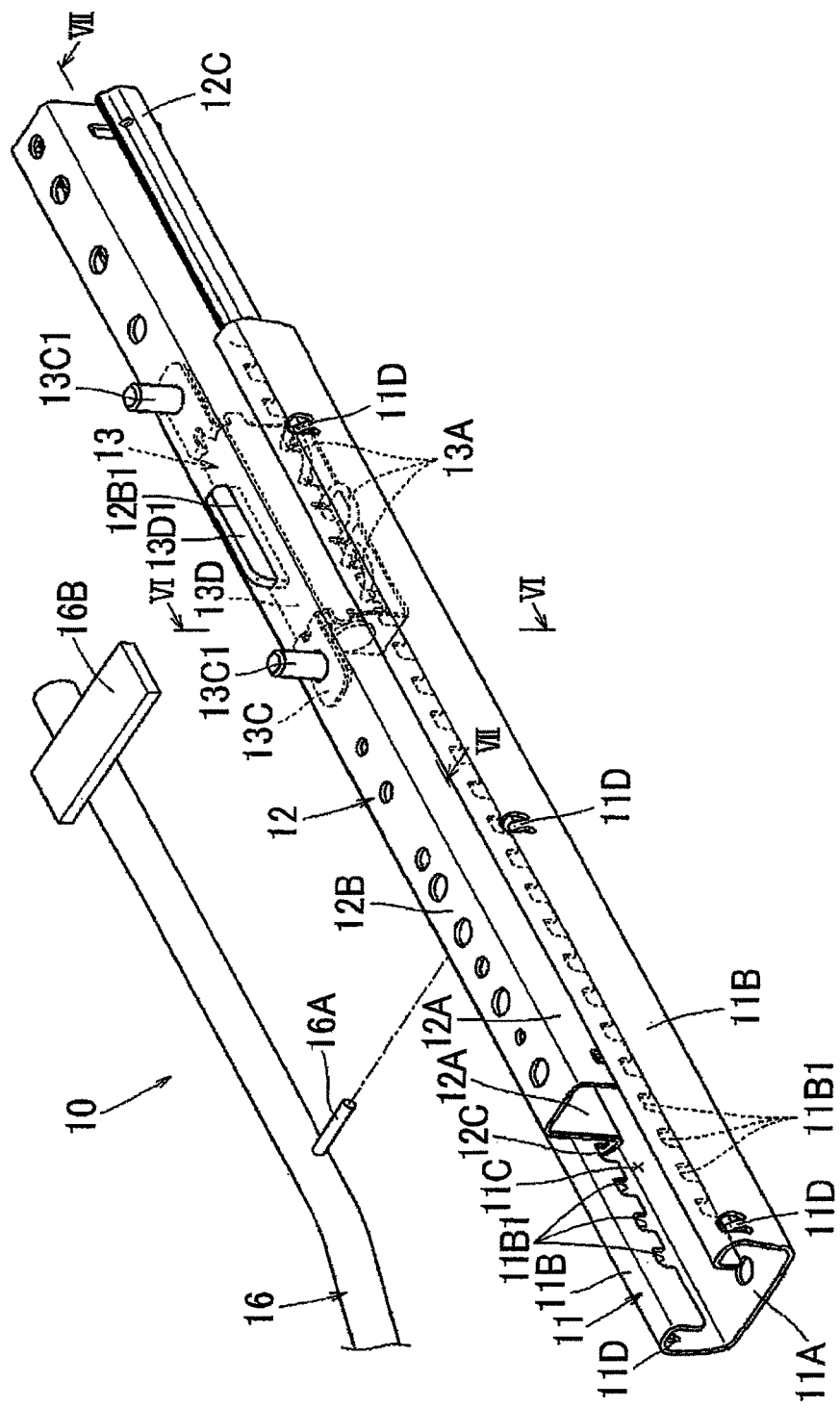
FIG. 3 is an enlarged perspective view of the slide rail.

When the right and left upper-side ridge portions 12C are inserted respectively into the right and left lower-side ridge portions 11B of the lower rail 11 in the longitudinal direction (the sliding direction), the upper rail 12 is assembled to the lower rail 11 (see FIG. 3). As a result, the right and left upper-side ridge portions 12C of the upper rail 12 are respectively hooked to the lower-side ridge portions 11B of the lower rail 11, so that the upper rail 12 is not allowed to be removed upward from the lower rail 11 (see FIG. 3 and FIG. 6). The frame (not illustrated) of the seat cushion 3 is fastened to the top wall portion 12B, which protrudes upward from the lower rail 11 to be exposed on the outside of the lower rail 11, with bolts, so that the seat cushion 3 is fixedly fitted to the upper rail 12 (see FIG. 1 and FIG. 2).

As illustrated in FIG. 4, insertion holes 12A1, through which the three locking springs 13A of the locking mechanism 13 can be inserted from below, are formed in the lower portion of each of the right and left vertical wall portions 12A of the upper rail 12. The insertion holes 12A1 are formed by cutting the vertical wall portions 12A so as to open downward. The insertion holes 12A1 are formed in the central portion of the upper rail 12 in the longitudinal direction (the sliding direction), and arranged at regular intervals in the sliding direction. The insertion holes 12A1 extend to prescribed positions of each of the right and left upper-side ridge portions 12C of the upper rail 12. Further, each insertion hole 12A1 has two locking slits 12A2. The locking slits 12A2 are located at the front end and the rear end of each insertion hole 12A1 in the front-rear direction (the sliding direction). The locking slits 12A2 are formed by cutting each of the vertical wall portions 12A of the upper rail 12 in the height direction of the upper rail 12.

Figure 7:
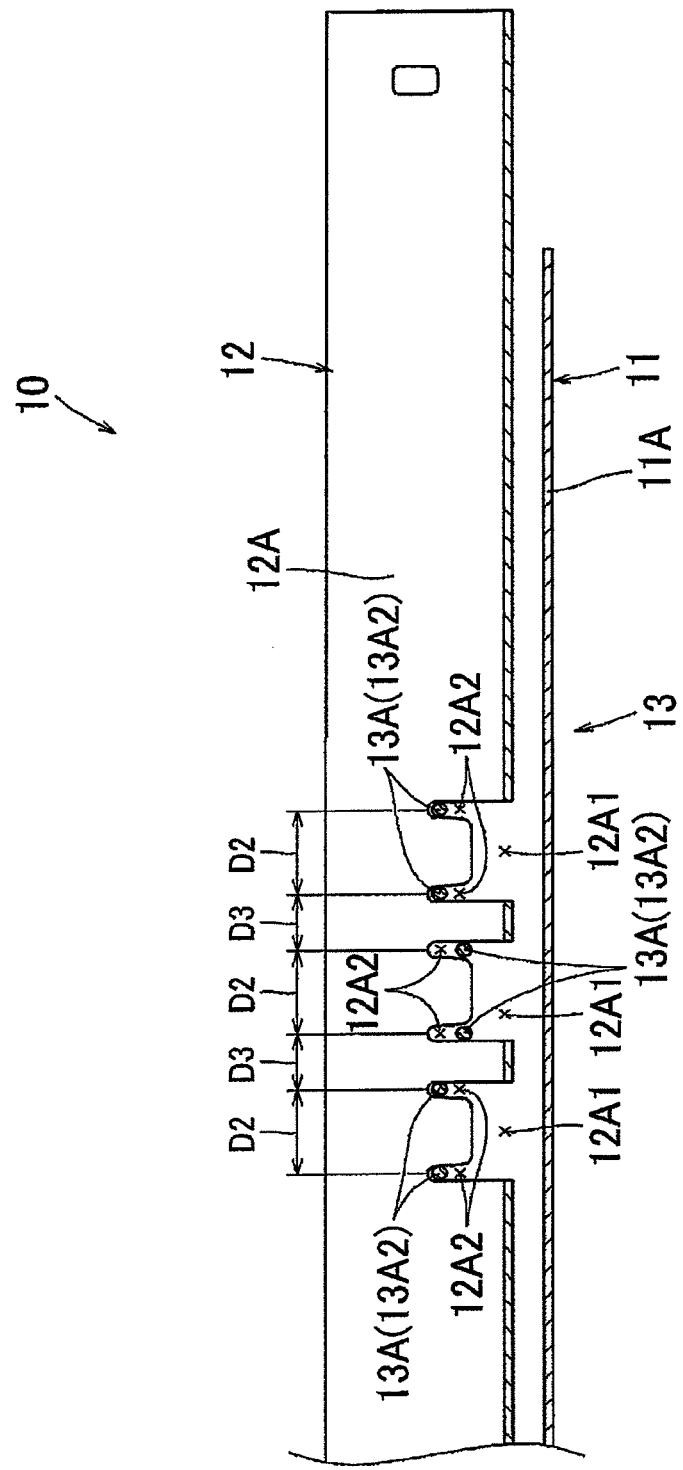
FIG. 7 is a sectional view taken along the line VII-VII in FIG. 3.
Figures 10A, 10B:
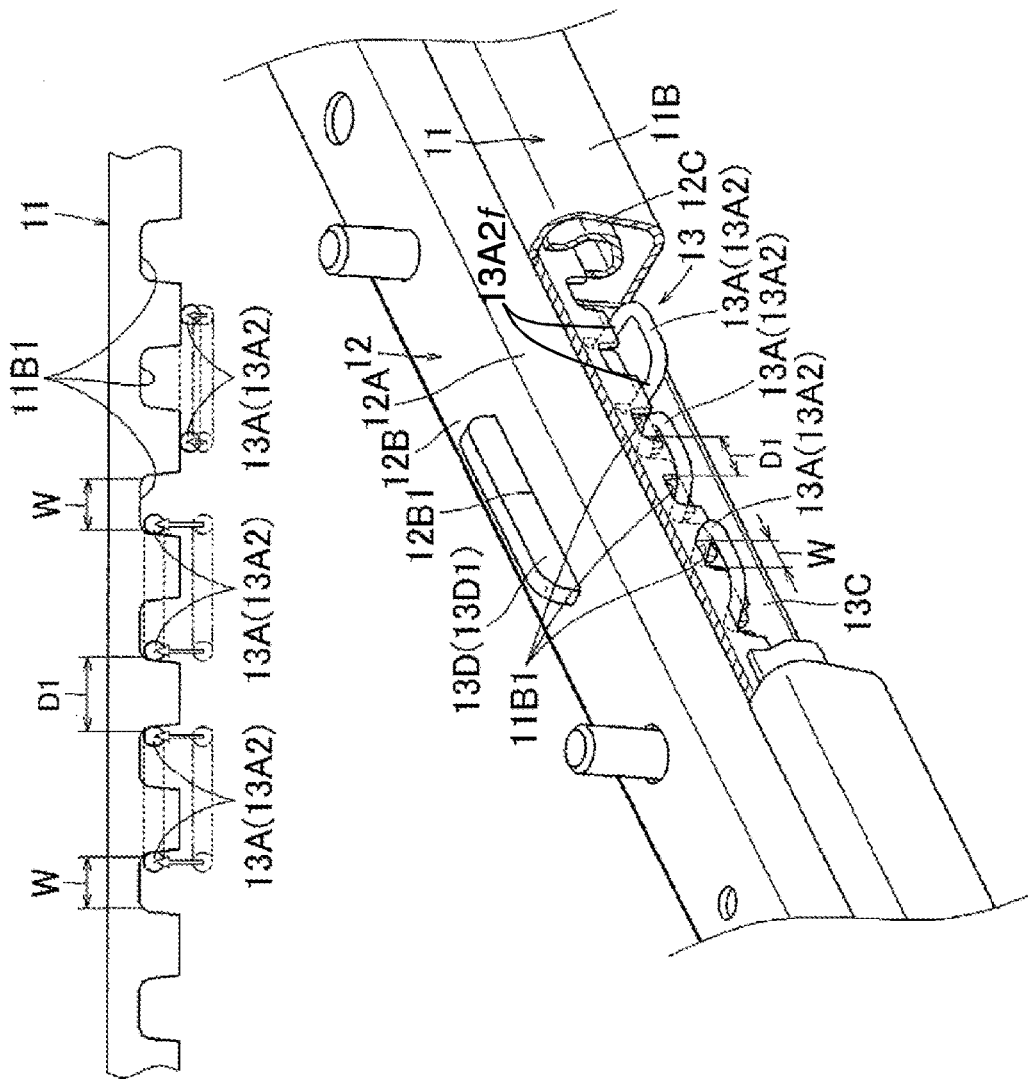
FIG. 10A is a schematic view illustrating a first lock pattern of the slide rail.
FIG. 10B is a side view illustrating the main portions of the slide rail illustrated in FIG. 10A.
Figures 11A, 11B:
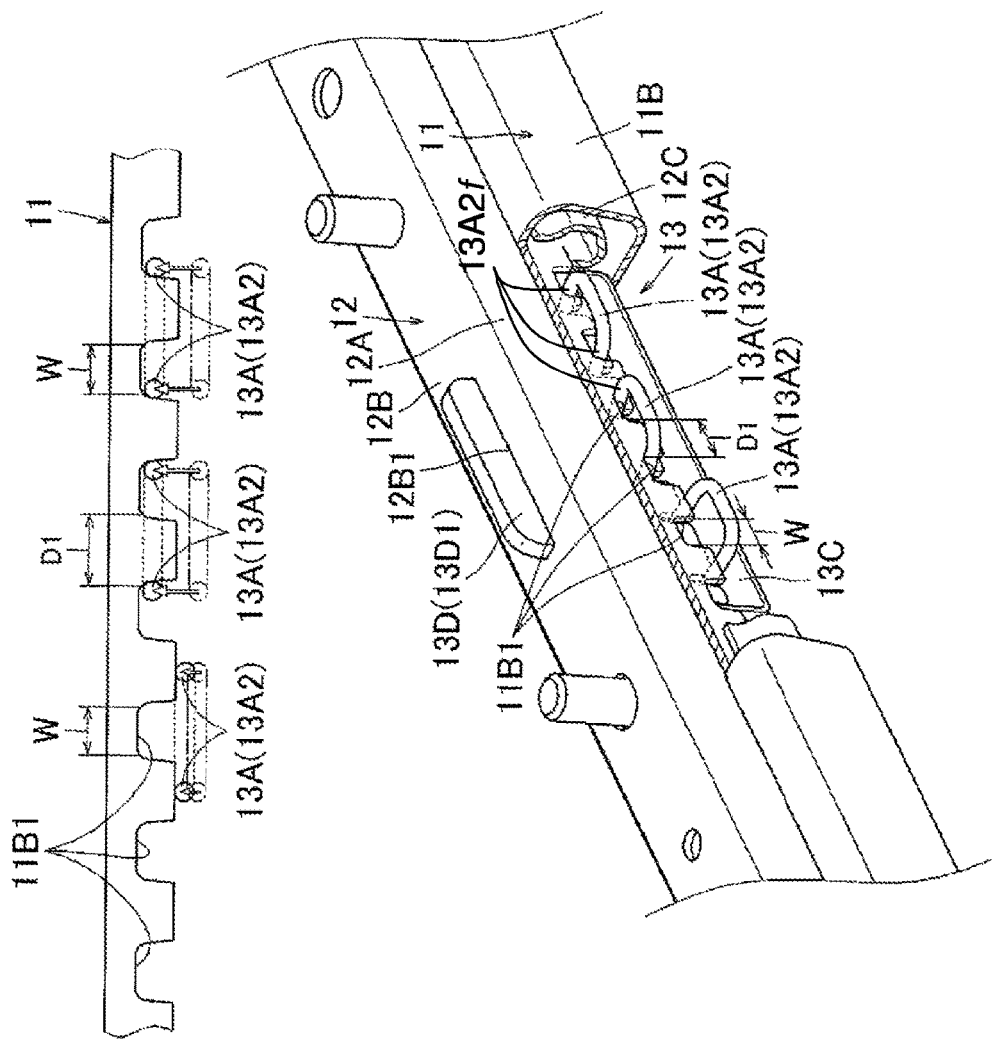
FIG. 11A is a schematic view illustrating a second lock pattern of the slide rail.
FIG. 11B is a side view illustrating the main portions of the slide rail illustrated in FIG. 11A.

The locking slits 12A2 have a slit width that is narrow enough so that front and rear frame portions 13A2f of each of right and left locking pieces 13A2 of each of the three locking springs 13A, which are inserted through the insertion holes 12A1, can be respectively inserted into the locking slits 12A2 without causing a backlash in the front-rear direction. That is, the slit width of each locking slit 12A2 is substantially equal to the wire rod diameter of each of the front and rear frame portions 13A2f of each locking piece 13A2. Specifically, as illustrated in FIG. 7, an interval D2 between the two adjacent locking slits 12A2 that extend from the same insertion hole 12A1 in the height direction is 15 mm. An interval D3 between the locking slit 12A2 of one insertion hole 12A1 and the locking slit 12A2 of the insertion hole 12A1 that is adjacent to the one insertion hole 12A1 is 10 mm in the sliding direction. The interval D3 is an interval between the locking slits 12A2 that are adjacent to each other in the sliding direction.

Figure 5:
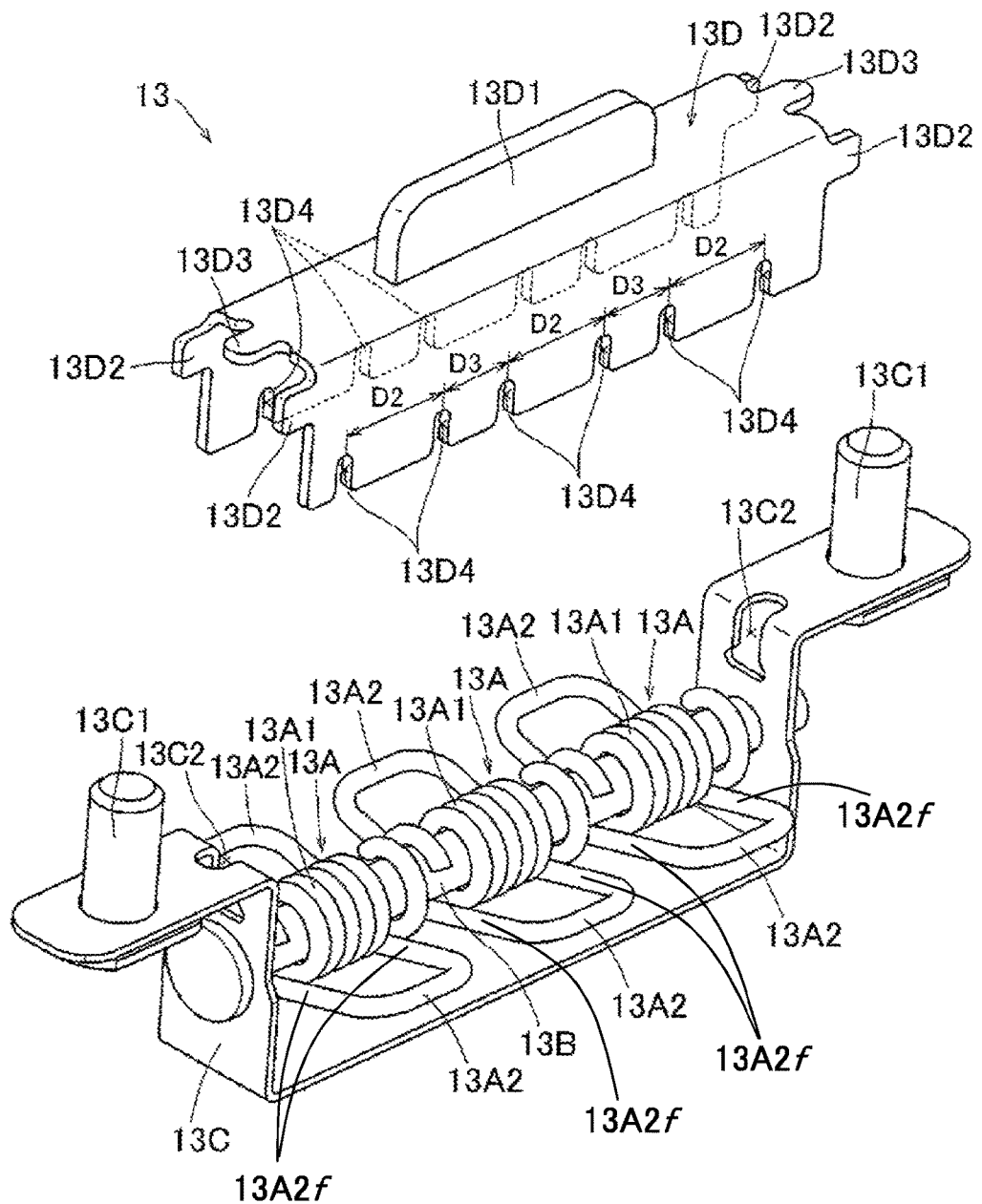
FIG. 5 is an exploded perspective view of a locking mechanism.

The intervals between the locking slits 12A2 are equal to the corresponding intervals between the frame portions 13A2f of the locking pieces 13A2 of the locking springs 13A (the intervals between the locking slits 12A2 are equal also to the corresponding intervals between slits 13D4 formed in the right and left lower portions of an unlocking member 13D illustrated in FIG. 5). Thus, it is possible to insert the frame portions 13A2f of the locking pieces 13A2 of the three locking springs 13A into the locking slits 12A2 concurrently.

As illustrated in FIG. 4, a through-hole 12B1 is formed in the central portion of the top wall portion 12B of the upper rail 12 in the sliding direction. The through-hole 12B1 is located at the center of the top wall portion 12B in the width direction of the upper rail 12. The through-hole 12B1 has a rectangular shape extending in the sliding direction. The through-hole 12B1 functions as an insertion hole through which a press projection 13D1 of the unlocking member 13D, which is operated to cancel the slide lock state of the locking mechanism 13, is inserted from below to be projected upward from the upper rail 12.

Each of turned-back portions of the right and left upper-side ridge portions 12C of the upper rail 12 is provided with the front stopper and the rear stopper (both are not illustrated) that define the maximum slide positions of the upper rail 12 in the front-rear direction when the front stopper is brought into contact with the front rail stopper (not illustrated) of the lower rail 11 or when the rear stopper is brought into contact with the rear rail stopper (not illustrated) of the lower rail 11.

Next, the four resin shoes 14 disposed between the upper rail 12 and the lower rail 11 will be described. As illustrated in FIG. 4, one steel ball 15 is rollably fitted in the upper end portion of each resin shoe 14, and two steel balls 14 are rollably fitted in the lower end portion of each resin shoe 14. As illustrated in FIG. 6, the resin shoes 14 are disposed between the right and left upper-side ridge portions 12C of the upper rail 12 and the right and left lower-side ridge portions 11B of the lower rail 11 in the width direction of the slide rail 10.

Specifically, the resin shoes 14 are disposed so as to extend between i) the inner sides of the base portions of the right and left lower-side ridge portions 11B of the lower rail 11, that is, the inner sides of the corners formed between the right and left lower-side ridge portions 11B and the bottom wall portion 11A and the inner sides of the corners formed by bending the right and left lower-side ridge portions 11B inward in the width direction. The resin shoes 14 are held between i) the inner sides of the right and left lower-side ridge portions 11B and ii) the portions of the right and left upper-side ridge portions 12C of the upper rail 12, which face the inner sides of the lower-side ridge portions 11B of the lower rail 11.

When the resin shoes 14 are disposed as described above, the steel balls 15 fitted in the upper and lower end portions of the resin shoes 14 are held, without leaving clearances, between the upper and lower outer end portions of the right and left upper-side ridge portions 12C of the upper rail 12 and the inner sides of the upper and lower corners of the right and left lower-side ridge portions 11B of the lower rail 11. Thus, the upper rail 12 is supported such that the upper rail 12 is allowed to smoothly slide back and forth relative to the lower rail 11 without causing a large backlash in the height direction or in the width direction.

Next, the configuration of the locking mechanism 13 illustrated in FIG. 3 to FIG. 6 will be described. As illustrated in FIG. 3 and FIG. 6, a main portion of the locking mechanism 13 is accommodated in a rail space defined by the top wall portion 12B and the right and left vertical wall portions 12A of the upper rail 12. As illustrated in FIG. 4 and FIG. 5, the locking mechanism 13 includes the three locking springs 13A, a support shaft 13B, a bracket 13C and the unlocking member 13D. The locking springs 13A are each formed by winding a single wire rod into a coil shape. The support shaft 13B is passed through coil portions 13A1 of the locking springs 13A to support the locking springs 13A. The support shaft 13B is fixed to the upper rail 12 via the bracket 13C. The unlocking member 13D is operated to press the locking springs 13A in such a direction that the upper rail 12 is unlocked from the lower rail 11.

As illustrated in FIG. 5, each locking spring 13A has the coil portion 13A1 having a coil shape, and a pair of the right and left locking pieces 13A2 that are formed by bending the wire rod at the intermediate positions of the coil portion 13A1 such that the locking pieces 13A2 having a U-shape project from the coil portion 13A1 rightward and leftward. When the coil portions 13A1 of the locking springs 13A are placed on the support shaft 13B that is inserted into the bracket 13C from the front side to be attached to the bracket 13C, the locking springs 13A are supported by the support shaft 13B.

The unlocking member 13D is placed on the right and left locking pieces 13A2 of the locking springs 13A from above. Thus, the locking springs 13A are held at the prescribed positions by the unlocking member 13D such that the rotational positions of the locking springs 13A relative to the support shaft 13B are stably maintained. The unlocking member 13D is assembled to the bracket 13C from above and disposed so as to be slidable in the up-down direction (described later in detail). The unlocking member 13D is pushed upward by the elastic force of the right and left locking pieces 13A2 of the locking springs 13A. Alternatively, the unlocking member 13D is pushed downward upon reception of the pressing force applied from above by the operation of pulling up the slide lever 16 (see FIG. 1), so that the unlocking member 13D pushes down the right and left locking pieces 13A2 of the locking springs 13A.

Specifically, as illustrated in FIG. 1, the slide lever 16 is formed of a round pipe bent into a U-shape, and the right and left side portions of the slide lever 16 are pivotably coupled to the inner side vertical wall portions 12A of the upper rails 12 with hinge pins 16A (see FIG. 3). Flat pressing plates 16B, which project outward in the seat width direction, are fixedly fitted to the rear end portions of the right and left side portions of the slide lever 16. The pressing plates 16B are disposed above the portions of the upper rails 12, in which the unlocking members 13D of the locking mechanism 13 are disposed.

As illustrated in FIG. 3 and FIG. 4, the upper portion of the unlocking member 13D is provided with the press projection 13D1 having a rectangular shape and projecting upward. The press projection 13D1 of the unlocking member 13D is passed through the top wall portion 12B of the upper rail 12 from below so as to project upward from the upper rail 12. With this configuration, in normal times when the slide lever 16 has not been pulled up, the unlocking member 13D is pushed upward by the elastic force of the locking springs 13A, so that the press projection 13D1 projects upward from the upper rail 12, as illustrated in FIG. 8A and FIG. 8B. On the other hand, when the slide lever 16 is pulled upward, the press projection 13D1 is pushed downward by the pressing plate 16B, so that the unlocking member 13D is pushed downward against the elastic force of the locking springs 13A, as illustrated in FIG. 9A and FIG. 9B.

As illustrated in FIG. 5, the bracket 13C extends in the sliding direction, and is formed of a single elongate steel sheet. Further, the central portion of the bracket 13C in its longitudinal direction is bent downward into a U-shape. As illustrated in FIG. 3 and FIG. 4, the front and rear top wall portions of the bracket 13C are brought into contact with the top wall portion 12B of the upper rail 12 from below and fastening bolts 13C1 are inserted into the front and rear top wall portions of the bracket 13C and fastened from below, so that the bracket 13C is fixedly fitted to the top wall portion 12B of the upper rail 12 from below.

Specifically, the bracket 13C is brought into contact with the central portion of the top wall portion 12B of the upper rail 12 in the width direction from below and fastened to the upper rail 12, so that the longitudinal direction of the bracket 13C coincides with the sliding direction of the upper rail 12. Thus, the support shaft 13B, which is passed through the bracket 13C from the front side and assembled to the bracket 13C, is disposed at the central position of the upper rail 12 in the width direction of the upper rail 12 and extends along the sliding direction.

As illustrated in FIG. 5, the three locking springs 13A are disposed between the front and rear vertical wall portions of the bracket 13C formed by bending the steel sheet into a U-shape. When the support shaft 13B, which is passed through the front and rear vertical wall portions of the bracket 13C, is passed through the coil portions 13A1 of the locking springs 13A, the locking springs 13A are supported by the bracket 13C via the support shaft 13B. Because the bracket 13C and the support shaft 13B are disposed at the central position of the top wall portion 12B of the upper rail 12 in the width direction and extend along the sliding direction, the locking pieces 13A2 of the locking springs 13A uniformly project outward from the central position of the upper rail 12 in the width direction, as illustrated in FIG. 3 and FIG. 4.

As illustrated in FIG. 5, each locking piece 13A2 of each locking spring 13A is formed in such an initial shape that the locking piece 13A2 extends obliquely upward in a free state. The locking pieces 13A2 of the locking springs 13A are inserted, from below, through the insertion holes 12A1 formed in the right and left vertical wall portions 12A of the upper rail 12. Thus, in the free state, the front and rear frame portions 13A2*f* of each locking piece 13A2 are respectively inserted in the front and rear locking slits 12A2 extending from the insertion hole 12A1 in the height direction.

As illustrated in FIG. 3, FIG. 8A and FIG. 8B, when the upper rail 12 is assembled to the lower rail 11, the locking pieces 13A2 of the locking springs 13A are inserted also into the locking slits 11B1 of the lower rail 11, which are located outward of the right and left locking slits 12A2 of the upper rail 12 in the width direction of the slide rail 10, so that the locking pieces 13A2 of the locking springs 13A prohibit the upper rail 12 from sliding relative to the lower rail 11 in the front-rear direction. However, as illustrated in FIG. 8A to FIG. 13B, because the locking slits 11B1 of the lower rail 11 having a wide slit width W are arranged at regular intervals of D1, the locking pieces 13A2 of only two of the three locking springs 13A (see FIGS. 8A, 8B and FIGS. 10A to 12B) are allowed to be concurrently inserted into the locking slits 11B1 of the lower rail 11 at the maximum, irrespective of the slide position of the upper rail 12.

Specifically, in normal times when the operation of pulling up the slide lever 16 has not been performed and thus the unlocking member 13D has not been pushed downward, the locking pieces 13A2 push the unlocking member 13D upward using their elastic force, so that the locking pieces 13A2 are inserted in both the locking slits 12A2 of the upper rail 12 and the locking slits 11B1 of the lower rail 11. As a result, the elastic force of the locking springs 13A prohibits the upper rail 12 from sliding relative to the lower rail 11. Thus, when the upper rail 12 is at such a slide position that the positions of the locking slits 12A2 of the upper rail 12 coincide with the positions of the locking slits 11B1 of the lower rail 11 in the sliding direction, the locking pieces 13A2 of at least one of the locking springs 13A, which are located at the positions at which the locking slits 12A2 and the locking slits 11B1 coincide with each other, are inserted into both the locking slits 12A2, 11B1. As a result, the upper rail 12 is prohibited from sliding relative to the lower rail 11.

As illustrated in FIG. 9A and FIG. 9B, when the unlocking member 13D is pushed downward in response to the operation of pulling up the slide lever 16, the locking pieces 13A2 are pushed and deflected downward concurrently by the unlocking member 13D so as to come out of the locking slits 11B1 of the lower rail 11. As illustrated in FIG. 5, the unlocking member 13D extends in the sliding direction, and is formed by bending a single elongate steel sheet such that the unlocking member 13D has an inverted U-shaped cross-section. Further, the upper portion of the unlocking member 13D is provided with the press projection 13D1 having a rectangular shape and projecting upward. When the unlocking member 13D is disposed between the front and rear vertical wall portions of the bracket 13C from above, the unlocking member 13D is assembled to the bracket 13C so as to be movable in the up-down direction.

Specifically, the unlocking member 13D is disposed between the vertical wall portions of the bracket 13C from above such that the vertical wall portions of the bracket 13C are held between guiding projections 13D2, which are formed to project from the front and rear edges of the right and left side wall portions. As a result, the unlocking member 13D is assembled to the bracket 13C so as to be movable in the up-down direction. Because the unlocking member 13D is assembled to the bracket 13C as described above, stoppers 13D3, which are formed to project from the front and rear edges of the upper wall portion, are inserted into cutouts 13C2 formed in the upper portions of the vertical wall portions of the bracket 13C, such that the stoppers 13D3 are allowed to be moved downward to such positions that the stoppers 13D3 come into contact with the bottom faces of the cutouts 13C2.

A plurality of slits 13D4 is formed in the bottom portions of the right and left side wall portions of the unlocking member 13D. The front and rear frame portions 13A2f of the right and left locking pieces 13A2 of the locking springs 13A are inserted into the slits 13D4 from below. When the unlocking member 13D is disposed onto the upper portions of the locking pieces 13A2 with the front and rear frame portions 13A2f of the right and left locking pieces 13A2 of the locking springs 13A inserted in the slits 13D4, the unlocking member 13D holds the front and rear frame portions 13A2f of the right and left locking pieces 13A2 of the locking springs 13A without causing a backlash in the sliding direction.

As illustrated in FIG. 3 and FIG. 4, when the bracket 13C is assembled to the top wall portion 12B of the upper rail 12 from below, the press projection 13D1 of the unlocking member 13D is passed through the through-hole 12B1 formed in the top wall portion 12B of the upper rail 12 from below and the press projection 13D1 projects upward from the top wall portion 12B. As illustrated in FIG. 8A and FIG. 8B, in normal times when the locking pieces 13A2 of the locking springs 13A are inserted in the locking slits 11B1 of the lower rail 11 by the elastic force of the locking springs 13A, the press projection 13D1 of the unlocking member 13D projects upward from the top wall portion 12B of the upper rail 12.

As illustrated in FIG. 9A and FIG. 9B, when the slide lever 16 illustrated in FIG. 1 is pulled up, the press projection 13D1 of the unlocking member 13D is operated so as to be pushed into the upper rail 12 by the pressing plate 16B of the slide lever 16. Thus, the unlocking member 13D pushes and deflects the right and left locking pieces 13A2 of the locking springs 13A downward, so that the locking pieces 13A2 come out of the locking slits 11B1 of the lower rail 11. On the other hand, when the operation of pulling up the slide lever 16 (see FIG. 1) is cancelled, the unlocking member 13D is restored in the original state illustrated in FIG. 8A and FIG. 8B, by the elastic force of the right and left locking pieces 13A2 of the locking springs 13A.

The right and left locking pieces 13A2 of each locking spring 13A are formed by bending the wire rod at the intermediate positions of the coil portion 13A1 such that the locking pieces 13A2 having a U-shape project from the intermediate positions rightward and leftward. Thus, the positions from which the locking pieces 13A2 on the right side extend from the coil portions 13A1 and the positions from which the locking pieces 13A2 on the left side extend from the coil portions 13A1 are offset from each other in the front-rear direction (the sliding direction). As a result, the positions of the locking pieces 13A2 on the right side and the positions of the locking pieces 13A2 on the left side are offset from each other in the front-rear direction (the sliding direction). In accordance with the positions of the locking pieces 13A2 of the locking springs 13A, as illustrated in FIG. 4, the slits 13D4 of the right side wall portion of the unlocking member 13D and the slits 13D4 of the left side wall portion of the unlocking member 13D are offset from each other in the front-rear direction (the sliding direction), the locking slits 12A2 on the right side of the upper rail 12 and the locking slits 12A2 on the left side of the upper rail 12 are offset from each other in the front-rear direction (the sliding direction), and the locking slits 11B1 on the right side of the lower rail 11 and the locking slits 11B1 on the left side of the lower rail 11 are offset from each other in the front-rear direction (the sliding direction).

As described above, the locking slits 11B1 of the lower rail 11 having a wide slit width W are arranged at regular intervals of D1. Thus, when the slide position of the upper rail 12 is changed, the locking pieces 13A2 of two of the locking springs 13A are concurrently inserted into the locking slits 11B1, in one of the following three modes: i) the mode in which the locking pieces 13A2 of the first and second locking springs 13A from the front are inserted into the locking slits 11B1 (see FIG. 10A and FIG. 10B); the mode in which the locking pieces 13A2 of the first and second locking springs 13A from the rear are inserted into the locking slits 11B1 (see FIG. 11A and FIG. 11B); and the mode in which the locking pieces 13A2 of the first locking spring 13A from the front and the locking pieces 13A2 of the first locking spring 13A from the rear are inserted into the locking slits 11B1 (see FIG. 12A and FIG. 12B).

When the locking pieces 13A2 of two of the three locking springs 13A are concurrently inserted into the locking slits 11B1, the locking pieces 13A2 of the two locking springs 13A come into contact with the front end wall portion or the rear end wall portion of the locking slits 11B1. As a result, the upper rail 12 is locked to the lower rail 11 such that the upper rail 12 is completely prohibited from sliding relative to the lower rail 11 in the front-rear direction (the slide lock state).

Figures 13A, 13B:
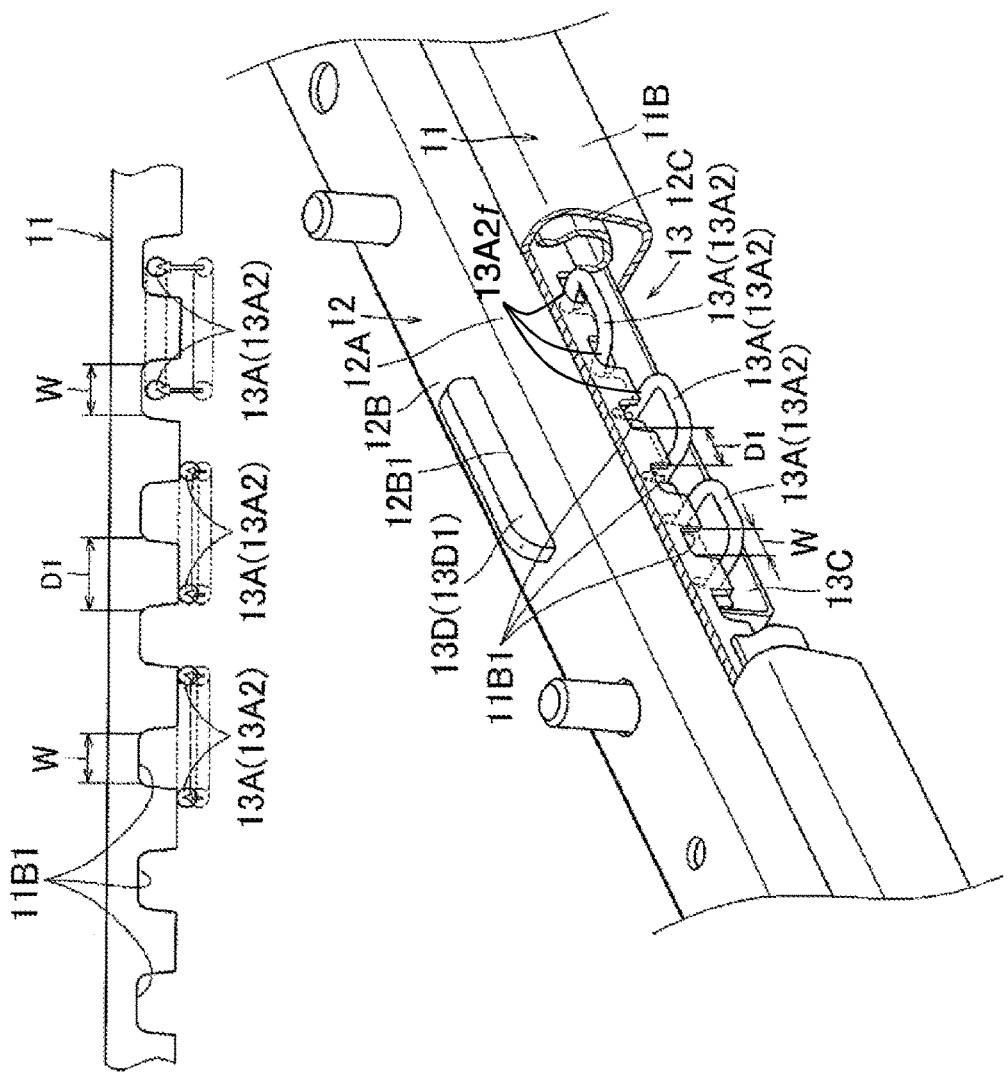
FIG. 13A is a schematic view illustrating the state where the slide rail is in a slide position at which the slide rail is not locked.
FIG. 13B is a side view of the main portions of the slide rail illustrated in FIG. 13A.

As illustrated in FIG. 13A and FIG. 13B, when the slide position of the upper rail 12 is other than the slide positions illustrated in FIG. 10A to FIG. 12B, the locking pieces 13A2 of only one of the locking springs 13A are inserted into the locking slits 11B1 of the lower rail 11. When the locking pieces 13A2 of only one of the three locking springs 13A are inserted into the locking slits 11B1, the upper rail 12 is allowed to slide relative to the lower rail 11 in the front-rear direction within a range in which the front and rear frame portions 13A2$f$ of the locking pieces 13A2 the one locking spring 13A are allowed to slide in the front-rear direction within the locking slits 11B1.

However, when the upper rail 12, which has been in the above-described state, slides in the front-rear direction and thus the front and rear frame portions 13A2$f$ of the locking pieces 13A2 of the one locking spring 13A reach the ends of the locking slits 11B1, the locking pieces 13A2 of one of the remaining two locking springs 13A reach such positions as to be allowed to be inserted into the locking slits 11B1. As a result, it is possible to achieve the state (the slide lock state) where the locking pieces 13A2 of two locking springs 13A are inserted into the locking slits 11B1.

Due to the above-described configuration, the locking pieces 13A2 of at least one of the locking springs 13A are always inserted into the locking slits 11B1 of the lower rail 11, irrespective of the slide position of the upper rail 12. Thus, irrespective of the slide position of the upper rail 12, the upper rail 12 is restrained from sliding relative to the lower rail 11 beyond a prescribed range even if an unexpected and abrupt sliding motion occurs due to, for example, a vehicle collision.

Specifically, for example, in the state where the upper rail 12 is at such a slide position that the locking pieces 13A2 of only one of the locking springs 13A are allowed to be inserted into the locking slits 11B1 of the lower rail 11 as illustrated in FIG. 13A and FIG. 13B, even if an unexpected and abrupt sliding motion occurs due to, for example, a vehicle collision, the sliding motion of the upper rail 12 relative to the lower rail 11 is stopped when the locking pieces 13A2 of the one locking spring 13A inserted into the locking slits 11B1 of the lower rail 11 come into contact with the ends of the locking slits 11B1. At this position, the locking pieces 13A2 of one of the remaining two locking springs 13A, which have not been locked, are inserted into the locking slits 11B1, so that the slide lock state is achieved. Thus, it is possible to firmly lock the upper rail 12 to the lower rail 11 such that the upper rail 12 is not allowed to slide relative to the lower rail 11 beyond the prescribed range. Thus, it is possible to prevent occurrence of "jumping" that is a phenomenon in which the locking pieces 13A2 of the locking springs 13A pass by the locking slits 11B1 of the lower rail 11 without being inserted into the locking slits 11B1.

As illustrated in FIG. 5 and FIGS. 8A, 8B, when the locking pieces 13A2 of two of the locking springs 13A are inserted into the locking slits 11B1 of the lower rail 11, a high structural strength is achieved, so that the locking springs 13A firmly locks the upper rail 12 to the lower rail 11 such that the sliding motion of the upper rail 12 relative to the lower rail 11 in the front-read direction is reliably prohibited.

Specifically, each locking spring 13A has a pair of the right and left locking pieces 13A2 that can to be inserted into the locking slits 11B1 of the lower rail 11. Further, the front and rear frame portions 13A2$f$ of each of the locking pieces 13A2 can be individually inserted into the locking slits 11B1 of the lower rail 11. In addition, the front and rear frame portions 13A2$f$ of the locking pieces 13A2 of each locking spring 13A are connected to each other in the shape of a loop. Thus, a high structural strength is achieved, so that it is difficult to twist or bend the front and rear frame portions 13A2$f$ individually. Further, the locking pieces 13A2 of each locking spring 13A project from the coil portion 13A1 on the opposite sides in the width direction, which is the lateral direction of the lower rail 11. Thus, the locking pieces 13A2 are short, so that a high structural strength is achieved.

Further, each locking spring 13A is configured to achieve the slide lock state, which is the state where the locking pieces 13A2 of the locking spring 13A are inserted into the slits 13D4 formed in the right and left side wall portions of the unlocking member 13D, the locking slits 12A2 formed in the right and left vertical wall portions 12A of the upper rail 12, and the locking slits 11B1 formed in the right and left lower-side ridge portions 11B of the lower rail 11. Thus, each of the right and left locking pieces 13A2 of each locking spring 13A comes into contact with the unlocking member 13D, the upper rail 12 and the lower rail 11 at short intervals in the direction in which the locking piece 13A2 extends, and receives shearing force in the sliding direction from these members. With this configuration, the intervals between the points at which loads act on each locking piece 13A2 are short. Thus, a high structural strength is achieved, so that each locking piece 13A2 is less likely to be bent and deflected by the loads.

For the aforementioned reasons, when the locking pieces 13A2 of two of the locking springs 13A are inserted into the locking slits 11B1 of the lower rail 11, the locking springs 13A firmly lock the upper rail 12 to the lower rail 11 such that the upper rail 12 is reliably prohibited from sliding relative to the lower rail 11 in the front-rear direction.

Each locking spring 13A is formed by winding a wire rod as described above. Thus, it is possible to form, from a single wire rod, each locking spring 13A that has a pair of the U-shaped locking pieces 13A2 that project in a direction along a cross-section of the upper rail 12, and the coil portion 13A1 that is wound around and thus fitted to the support shaft 13B. Each locking spring 13A is compact in the sliding direction, and the two locking pieces 13A2 of each locking spring 13A are arranged side by side in the width direction of the upper rail 12.

Figure 14:
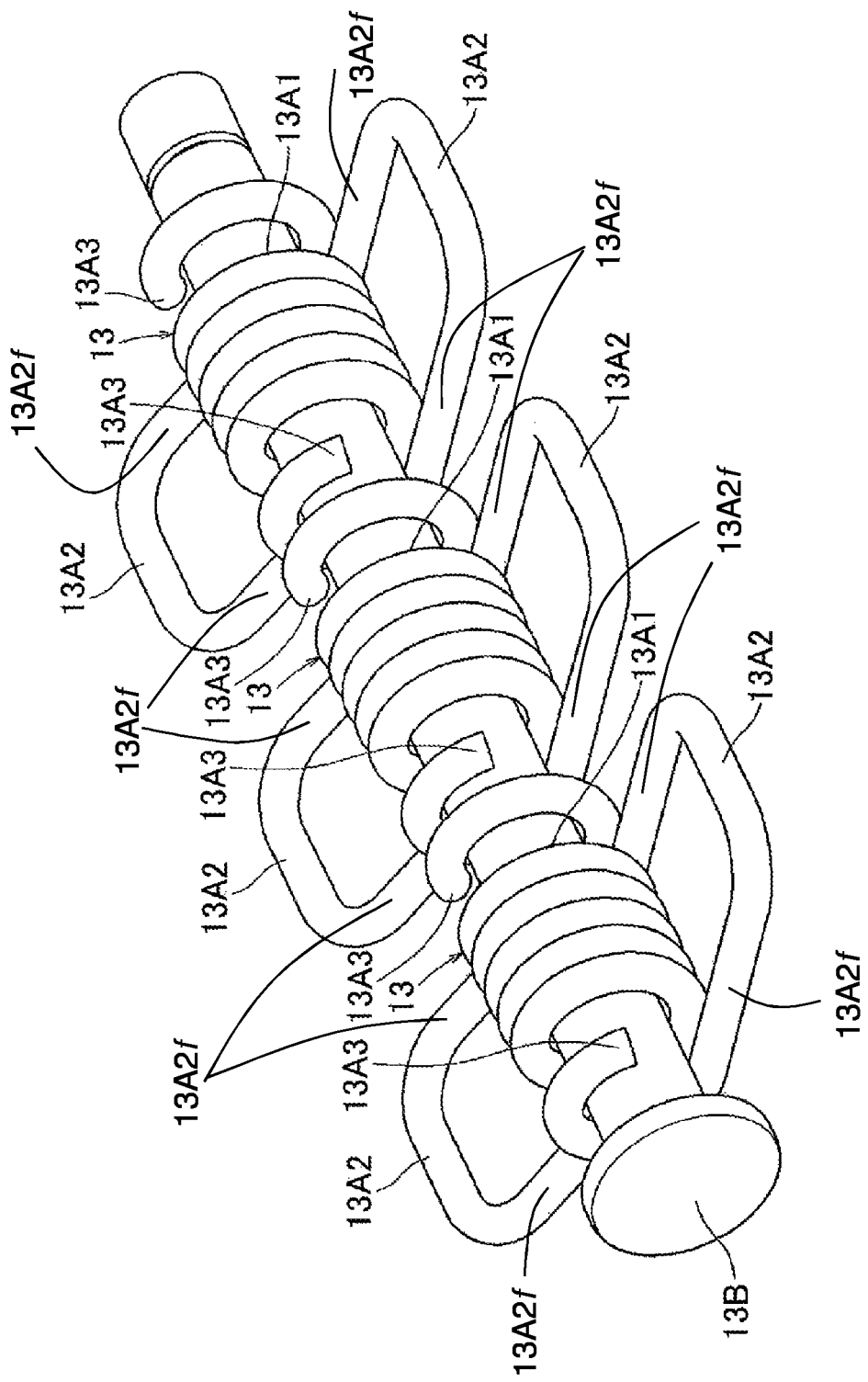
FIG. 14 is an enlarged perspective view of a locking spring.

Each locking spring 13A is formed by bending a single steel wire rod so as to have the coil portion 13A1 and a pair of the right and left locking pieces 13A2. Specifically, as illustrated in FIG. 14, each locking spring 13A is formed by bending a wire rod such that the U-shaped locking piece 13A2 on one side (the right side in FIG. 14) projects from one end portion of the locking spring 13A on one side in the sliding direction (the front end portion of the locking spring 13A) toward the other end portion of the locking spring 13A on the other side in the sliding direction (the rear end portion of the locking spring 13A), winding the wire rod from a bending end position of the locking piece 13A2 on the one side back toward the one side (the front side) in the sliding direction to form the coil portion 13A1, and bending the wire rod such that the U-shaped locking piece 13A2 on the other side (the left side in FIG. 14) projects from a winding end position of the coil portion 13A1 toward the other end portion of the locking spring 13A on the other side in the sliding direction (the rear end portion of the locking spring 13A).

Further, each locking spring 13A is formed to have curved portions 13A3 at the one end portion (the front end portion) and the other, end portion (the rear end portion) in the sliding direction. The curved portions 13A3 are curved in such a shape as to be wound around the support shaft 13B that is passed through the coil portion 13A1. Each curved portion 13A3 is curved so as to have substantially the same size and shape as a single loop of the coil portion 13A1. Each curved portion 13A3 is formed in such a shape as to be wound around three-fourths of circumferential region of the outer periphery of the support shaft 13B.

The end portions (the front end portion and the rear end portion) of the wire rod that constitutes each locking spring 13A is formed in such a shape as to be wound around the support shaft 13B. Thus, it is possible to suppress backlash and deflection that cause each locking piece 13A2 to move in a direction away from the support shaft 13B. Thus, when the locking pieces 13A2 are inserted into the locking slits 11B1, if a large load that forcibly displaces the upper rail 12 or the lower rail 11 in the sliding direction is applied to the upper rail 12 or the lower rail 11, the displacement in the sliding direction is reliably prevented because each locking piece 13A2 is firmly hooked to the support shaft 13B without being removed from the support shaft 13B. As a result, it is possible to further increase the locking strength with which the upper rail 12 is locked to the lower rail 11.

As described above, the slide rail 10 according to the present embodiment is configured such that the locking pieces 13A2 of each locking spring 13A extend in a direction along a cross-section (the width direction, in the present embodiment) of the upper rail 12 (one rail in the invention) from the position in the locking spring 13A, at which the locking spring 13A is supported by the upper rail 12. The locking pieces 13A2 of the locking springs 13A are inserted into the locking slits 11B1 of the lower rail 11 (the other rail in the invention) by deflection deformation of the locking pieces 13A2 of the locking springs 13A in an in-plane direction of the cross-section of the upper rail 12 (the upward direction in the present embodiment).

It is possible to simplify the configuration by causing deflection deformation of the locking pieces 13A2 of the locking springs 13A such that the locking pieces 13A2 of the locking springs 13A are directly inserted into the locking slits 11B1 of the lower rail 11. The locking pieces 13A2 of the locking springs 13A are not deflected and deformed in the sliding direction when being inserted into the locking slits 11B1 of the lower rail 11. Thus, it is not necessary to provide each locking slit 11B1 with a clearance that allows the deformation of the locking spring 13A in the sliding direction. Thus, it is possible to provide the locking mechanism 13 with a less backlash in the sliding direction, the locking mechanism 13 being composed of a smaller number of components.

The locking springs 13A are accommodated in the rail space defined by the upper rail 12 and the lower rail 11. With this configuration, each locking spring 13A is formed in a compact size, so that the locking spring 13A does not project from the upper rail 12 and the lower rail 11. Further, it is possible to improve the locking strength by reducing the effective deflection length of each of the right and left locking pieces 13A2 of each locking spring 13A.

Each locking spring 13A has a pair of the locking pieces 13A2 that respectively project outward on the opposite sides from the central position of the upper rail 12 in the width direction, and the locking pieces 13A2 are concurrently inserted into the locking slits 11B1 of the lower rail 11 in the height direction of the upper rail 12. With this configuration, it is possible to provide the compact locking mechanism 13 with improved locking strength, by reducing the length of each of the right and left locking pieces 13A2 of each locking spring 13A. In addition, it is possible to provide the configuration including a pair of the locking pieces 13A2 with improved locking strength, so that the upper rail 12 is locked to the lower rail 11 in a balanced manner in the width direction.

Each locking spring 13A has a pair of the right and left locking pieces 13A2 that project outward in the width direction. Thus, a wide clearance is left below the coil portion 13A1 located at the central position of the locking spring 13A in the width direction. The wide clearance makes it possible to avoid contact with the locking springs 13A. Thus, even when the bracket 13C is passed through this region, the locking springs 13A are appropriately deflected to function appropriately without coming into contact with the bottom of the bracket 13C. If the bracket 13C is split into the front portion and the rear portion such that an empty space is formed in the region below the locking spring 13A, this region can be effectively utilized as a region that makes it possible to avoid the contact with the head of the bolts for fixing the lower rail 11 to the floor F.

The locking pieces 13A2 of the locking springs 13A are inserted into the locking slits 11B1 of the lower rail 11 by the restoring deformation around an axis extending in the sliding direction. Further, portions of the locking pieces 13A2, which are located between other portions of the locking pieces 13A2 that are inserted into the locking slits 11B1 and the axis of the locking spring 13A, are pushed, so that the slide lock state is cancelled. As described above, because the portions of each locking spring 13A, which are moved by a small amount by a pivot motion, are used as unlocking operation portions, the operation amount for cancelling the slide lock state of each locking spring 13A can be set small.

Further, a plurality of the locking springs 13A is provided, and the pitch between the locking slits 11B1 is defined such that the locking pieces 13A2 of at least one of the locking springs 13A are allowed to be inserted into the locking slits 11B1 irrespective of the slide position of the upper rail 12. Because the locking pieces 13A2 of at least one of the locking springs 13A are allowed to be inserted into the locking slits 11B1 irrespective of the slide position of the upper rail 12, even if an unexpected and abrupt sliding motion is caused due to, for example, a vehicle collision, it is possible to prohibit the upper rail 12 from sliding relative to the lower rail 11 beyond a prescribed range.

While one embodiment of the invention has been described above, the invention may be implemented in various other embodiments. For example, the slide rail in the invention may be provided in order to couple seats of an automobile other than a driver's seat, seats of vehicles other than an automobile, and seats provided for conveyances such as a railway vehicle and an aircraft to floors such that the seats are slidable relative to the floors. Further, the slide rail may be disposed between a conveyance seat and a floor horizontally instead of being tilted. The slide rail may be configured such that a conveyance seat is slidable relative to a floor in the lateral direction.

The locking spring may be configured such that the locking spring is attached to the lower rail and is inserted into locking slits formed in the upper rail to prohibit the upper and lower rails from sliding relative to each other. In the above embodiment, three locking springs are provided in order to prevent jumping in the event of an emergency. However, the number of the locking springs is not limited to three or more, as long as at least one locking spring is provided. Note that, in order to prevent jumping in the event of an emergency, at least two locking springs should be provided.

The configuration of each locking spring is not limited to the configuration described in the above embodiment, as long as each locking spring is configured such that the locking pieces of the locking spring extend from the position in the locking spring, at which the locking spring is supported by one rail, which is one of the upper rail and the lower rail, in a direction along a cross-section of the one rail and the locking pieces are inserted into the locking slits formed in the other rail, which is the other one of the upper rail and the lower rail, by the deflection deformation of the locking pieces in an in-plane direction of the cross-section of the one rail. For example, the configuration in which the locking pieces of each locking spring extend in the height direction of the one rail and are deflected in the width direction of the one rail may be adopted instead of the configuration in which the locking pieces of each locking spring extend in the width direction of the one rail and are deflected in the height direction of the one rail as described in the above embodiment. The locking spring having a locking piece that projects only on one side in the direction along the cross-section of the one rail may be adopted instead of the locking spring having a pair of the right and left locking pieces that project on the opposite sides in the direction along the cross-section of the one rail as described in the above embodiment. The locking spring may have a locking piece having a shape other than a U-shape (e.g. a locking piece that linearly extends) and projecting in a direction along the cross-section of the one rail. The locking spring is not limited to the locking spring accommodated in the rail space defined by the upper rail and the lower rail, and may be a locking spring disposed outside the rails.

The operation for cancelling the locked state of the locking springs may be a pulling operation instead of a pushing operation.

What is claimed is:

1. A slide rail for a conveyance seat, the slide rail comprising:
   a lower rail;
   an upper rail slidably assembled to the lower rail and configured to be attached to the conveyance seat;
   a plurality of locking springs supported by one rail that is one of the lower rail and the upper rail, each of the locking springs having an elastic locking piece that is insertable into a plurality of locking slits defined on another rail that is the other one of the lower rail and the upper rail to prohibit the upper rail and the lower rail from sliding relative to each other in a slide lock state; and
   an unlocking member that cancels the slide lock state in which the lower rail and the upper rail are prohibited from sliding relative to each other, wherein
   the locking piece extends in a direction along a cross-section of the one rail from a position in each of the locking springs, at which each of the locking springs is supported by the one rail,
   the locking piece is insertable into the locking slits by deflection deformation of the locking piece in an in-plane direction of the cross-section of the one rail,
   the locking piece is insertable into the locking slits by restoring deformation around an axis of the locking spring extending in a sliding direction in which the lower rail and the upper rail slide relative to each other, a pitch between the locking slits being defined such that the locking piece of at least one of the plurality of locking springs is insertable into the locking slits irrespective of a slide position of the upper rail, and
   the unlocking member is operated to cancel the slide lock state such that when the slide rail is unlocked, the unlocking member directly pushes against the locking piece.

2. The slide rail according to claim 1, wherein the plurality of locking springs are accommodated in a rail space defined by the lower rail and the upper rail.

3. The slide rail according to claim 1, wherein
   the locking piece includes a pair of locking pieces,
   the pair of locking pieces respectively project outward on opposite sides in the direction along the cross-section of the one rail from a central position of the one rail in a width direction of the one rail, and
   the pair of locking pieces are configured to be concurrently insertable into a corresponding number of the locking slits in a height direction of the one rail.

4. The slide rail according to claim 1, wherein
   each of the locking springs is defined by a bent single wire rod,
   each of the locking springs has a coil portion that is wound around and fitted to a support shaft supported by at least one of the one rail or the another rail,
   the locking piece includes a pair of locking pieces,
   the pair of locking pieces respectively extend from the coil portion on opposite sides in the direction along the cross-section of the one rail, the another rail including a corresponding number of the locking slits to receive the pair of locking pieces, and the pair of locking pieces being inserted into the respective locking slits by deflection deformation of the pair of locking pieces in the in-plane direction of the cross-section of the one rail, and
   both end portions of the wire rod that constitutes the locking spring are wound around the support shaft.

5. The slide rail according to claim 4, wherein
   each of the locking pieces of each of the locking springs has a U-shape, and projects from the coil portion in the direction along the cross-section of the one rail,
   each of the locking pieces of each of the locking springs has frame portions extending in the direction along the cross-section of the one rail that are spaced from one another in the sliding direction, and
   the frame portions of each of the locking pieces are inserted into the corresponding number of the locking slits.

6. The slide rail according to claim 5, wherein
   the wire rod is bent such that each of the locking pieces on one side of each locking spring projects from one end portion of the locking spring on one side in the sliding direction toward another end portion of the locking spring on the other side in the sliding direction,
   the wire rod is wound from a bending end position of the locking piece in the sliding direction to define the coil portion,
   the wire rod is bent such that the locking pieces on the another side projects from a winding end position of the coil portion toward the other end portion of the locking spring on the other side in the sliding direction, and
   the one end portion of the locking spring in the sliding direction and the other end portion of the locking spring in the sliding direction are each curved in such a shape as to be wound around the support shaft that is passed through the coil portion.

7. The slide rail according to claim 1, wherein
   each of the locking springs is a locking coil spring.

8. The slide rail according to claim 1, wherein
the locking piece of each of the locking springs projects outward in the direction along the cross-section of the one rail from a central position of the one rail in a width direction of the one rail.

\* \* \* \* \*